United States Patent [19]

Blake et al.

[11] Patent Number: 5,469,257

[45] Date of Patent: Nov. 21, 1995

[54] FIBER OPTIC GYROSCOPE OUTPUT NOISE REDUCER

[75] Inventors: James N. Blake, College Station, Tex.; Glen A. Sanders, Scottsdale; Lee K. Strandjord, Glendale, both of Ariz.

[73] Assignee: Honeywell Inc., Minneapolis, Minn.

[21] Appl. No.: 158,116

[22] Filed: Nov. 24, 1993

[51] Int. Cl.$^6$ .................................................. G01C 19/72
[52] U.S. Cl. .................................................. 356/350
[58] Field of Search .................................. 356/350, 345; 250/227.19, 227.27; 385/12, 14

[56] References Cited

U.S. PATENT DOCUMENTS 5,331,404  7/1994  Moeller et al. ......................... 356/350

OTHER PUBLICATIONS

R. Moeller et al., "1.06–μm all–fiber gyroscope with noise subtraction," Dec. 1, 1991, *Optics Letters*, vol. 16, No. 23.
Article entitled "Intensity Noise in Long–Wavelength Superluminescent Sources", by Chung E. Lee and Henry F. Taylor, pp. 1171–1174, *IEEE Journal of Quantum Electronics*, vol. 27, No. 5, May 1991.
P2 "1.06 μm All–Fiber Gyroscope with Noise Subtraction" by R. P. Moeller and W. K. Burns, *Proceedings of the Conference on Optical Fibers Sensors*, Jan. 19, 1992, Monterey, California, pp. 82 through 85. Sponsored by the Institute of Electrical and Electronic Engineers–Optical Society of America.

*Primary Examiner*—Samuel A. Turner
*Attorney, Agent, or Firm*—John G. Shudy, Jr.

[57] ABSTRACT

A noise reducer for reducing the results in the system output signal of optical noise introduced into an optical subsystem therein, having a phase modulator, by a source through obtaining a noise representation signal used to offset the noise components in the signal obtained from the output of the optical subsystem. This noise representation signal is not delayed in the obtaining thereof by any more than half the delays of the waves emitted from the source in reaching the optical subsystem output. The noise reducer may incorporate a device for adjusting the amplitude of the noise representation signal. It may also include another device for adjusting the phase of the noise representation signal, which may be used to affect the amplitude of the noise representation signal. These adjustments can result in an optimization of the noise representation signal so as to better effectively cancel the optical noise signal at the output of the fiber optic gyro having the noise reducer. The phase adjustment may be accomplished by affecting the phase of the bias modulation signal that goes to demodulate the fiber optic gyroscope system output signal or to demodulate both the fiber optic gyroscope system output signal and the noise representation signal, before the two latter signals are combined. A generator may be used for constructing a periodic signal, such as a triangular wave, having an appropriate amplitude and phase, to be a noise representation signal that is used to offset or cancel the noise components in the output signal from the fiber optic gyroscope system.

16 Claims, 12 Drawing Sheets

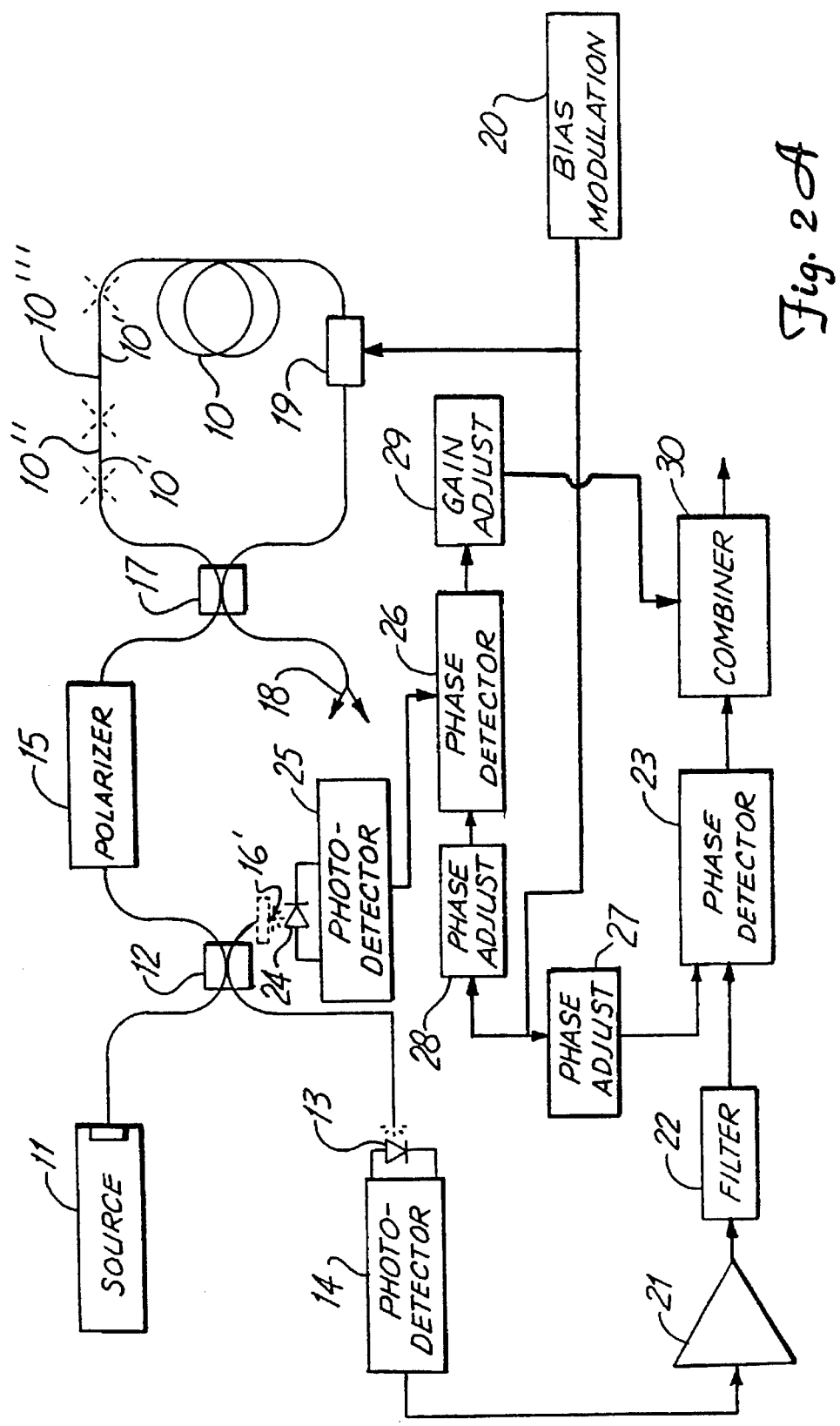

5,469,257

FIBER OPTIC GYROSCOPE OUTPUT NOISE REDUCER

BACKGROUND OF THE INVENTION

The present invention relates to fiber optic gyroscopes used for rotation sensing and, more particularly, to interferometric fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates which can be a problem in other types of optical gyroscopes.

There are various forms of optical inertial rotation sensors which use the well-known Sagnac effect to detect rotation about a pertinent axis thereof. These include active optical gyroscopes which have the gain medium contained in an optical cavity therein, such as the ring laser gyroscope, and passive optical gyroscopes without any gain medium in the primary optical path, such as the interferometric fiber optic gyroscope and the ring resonator fiber optic gyroscope. The avoidance of having the active medium along the primary optical path in the gyroscope eliminates some problems which are encountered in active gyroscopes, such as low rotation rate lock-in, bias drift and some causes of scale factor variations.

Interferometric fiber optic gyroscopes typically employ a single spatial mode optical fiber of a substantial length, typically 100 to 2,000 meters, which length is formed into a coil by being wound on a core to form a closed optical path. An electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce a phase shift between those waves in interferometric fiber optic gyroscopes in either rotation direction, i.e. the well-known Sagnac effect. The use of a coiled optical fiber is desirable because the amount of phase difference shift due to rotation, and so the output signal, depends on the length of the entire optical path through the coil traversed by the two opposing directional electromagnetic waves. Thus, a relatively large phase shift difference can be obtained in a long optical fiber, but also in the relatively small volume taken by that fiber in its being coiled.

The output current from the photodetector system photodiode in response to the opposite direction traveling electromagnetic waves impinging thereon, after passing through the coiled optical fiber, follows a raised cosine function, that is, the output current depends on the cosine of the phase difference between these two waves. Since a cosine function is an even function, such an output function gives no indication as to the relative direction of the phase difference shift, and so no indication as to the direction of the rotation about the axis. In addition, the rate of change of a cosine function near zero phase value is very small, and so such an output function provides very low sensitivity for low rotation rates.

Because of these unsatisfactory characteristics, the phase difference between the two electromagnetic waves is usually modulated by placing an optical phase modulator on one side of the coiled optical fiber. As a result, one of the opposite direction propagating waves passes through the modulator just after entering the coil, while the other wave, traversing the coil in the opposite direction, passes through the modulator just before exiting the coil. In addition, a phase sensitive demodulator is provided to receive the photodetector output current. Both the optical phase modulator and the phase sensitive demodulator are typically operated by a sinusoidal signal generator providing a signal of a selected fundamental frequency, but other waveform types of a similar fundamental frequency can also be used. A particularly good choice for this fundamental frequency is the "proper" frequency equal to the value $\pi$ divided by the propagation delay through the coiled optical fiber, if the system can be operated at that frequency which is usually a relatively high frequency. Operation at this frequency will reduce or eliminate certain phase modulator induced problems such polarization modulation.

The resulting signal output of the phase sensitive demodulator follows a sine function, i.e. the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and the maximum rate of change of signal value as a function of rotation rate near a zero rotation rate. That is, the signal has its maximum sensitivity near zero phase shift so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator is a substantial improvement over the characteristics of the output current of the photodetector.

Reducing erroneous phase shifts from other sources is, however, a difficult problem in fiber optic gyroscopes. Avoidance of erroneous phase shifts in the electromagnetic waves reaching the photodetector requires that each of the interfering waves, at least those of the same wavelength, have traveled over the same optical path, that is, the electromagnetic wave of a wavelength associated with a clockwise direction of travel from the coil and the one of the same wavelengths associated with the counterclockwise direction of the coil each must travel over an indistinguishable optical path from the source to the photodetector absent any rotation of the coil. A system with this characteristic is often termed "reciprocal." At a minimum, the optical paths corresponding to the common wavelength clockwise electromagnetic waves and counterclockwise electromagnetic waves must be identical on an optical ray tracing basis in the absence of rotation. In meeting this requirement, a "minimum reciprocal configuration" has been found to be as shown in FIG. 1 in connection with the coiled optical fiber, 10, shown there. Coiled optical fiber 10 in FIG. 1 is, as indicated above, wound about a core or spool using a single spatial mode optical fiber wrapped about an axis thereof which becomes the axis about which rotation is to be sensed. The use of such a single mode fiber allows the paths of the electromagnetic waves to be defined nearly uniquely, and further allows the phase fronts of such a guided wave to be defined uniquely. This greatly aids in maintaining reciprocity.

In addition, the optical fiber may be a so-called polarization-maintaining fiber in that a very significant birefringence is constructed in the fiber so that birefringence introduced by mechanical stress, which is unavoidable, and by the Faraday effect in magnetic fields, or from other sources, and which can lead to randomly varying phase difference shifts, becomes relatively insignificant. Thus, either the high refractive index axis, i.e. the slower propagation axis or the "x" axis, or the low refractive index axis, i.e. the faster propagation axis or the "y" axis, is chosen for primarily propagating the electromagnetic waves depending on the other optical components in the system.

On the other hand, such polarization-maintaining optical fiber is relatively expensive so that there is a substantial desire to be able to use just ordinary single spatial mode optical fiber. That desire can be satisfied with the use of primarily ordinary single mode optical fiber for coiled optical fiber 10. However, the optical fiber in coil 10 is then not entirely ordinary single spatial mode optical fiber because of a depolarizer, 10', (having the splices associated therewith shown in dashed lines to indicate that this is an alternative) is included relatively near one end thereof, although this depolarizer could be located anywhere in coil 10. This depolarizer is required because the ordinary single spatial mode optical fiber used in a very great fraction of this version of coil 10 is subject to having changing birefringence therein introduced by mechanical stress changing with temperature, and by the Faraday effect in magnetic fields. This changing birefringence will lead to randomly varying polarization rotations of the beams passing therethrough even to the extent of being so great that the interference of those beams at the photodetector vanishes.

Depolarizer 10' is in coil 10 positioned near one end in coil 10 for ease of winding that coil. Such a depolarizer tends to closely equalize the electromagnetic wave intensities in, and decorrelate, the two orthogonal polarization modes permitted therein and overwhelm the effects of the randomly changing birefringence in the ordinary single spatial mode fiber in the rest of coil 10 thus preventing such opposing direction beam interference at the optical subsystem portion output photodiode from vanishing.

Such a depolarizer can be formed with two lengths of polarization-maintaining fiber, 10" and 10''', with the latter being substantially twice as long as the former to thereby cause approximately twice the optical delay caused by the other. In each of these lengths, there is a high refractive index axis, i.e. the slower propagation axis or the "x" axis, and a low refractive index axis, i.e. the faster propagation axis or "y" axis, which are orthogonal to one another. The lengths are joined in a fused splice in such a manner that the "x" axis in one length is approximately equidistant from the "x" and "y" axes in the other length, i.e. the "x" axis in the former is at 45° from each of the "x" and "y" axes in the other. The opposite ends of each of the depolarization fiber lengths are then spliced by fusing to corresponding portions of the single spatial mode ordinary optical fiber in coil 10 so that a beam of light, propagating through any of the depolarizer or either of the single spatial mode ordinary optical fiber portions, substantially propagates through all of them.

Coil 10, as either polarization-maintaining optical fiber or as ordinary single mode optical fiber with depolarizer 10' therein, is typically wound on a spool using the "quadrupole" technique so that similarly located points in the coil with respect to center are near one another. This reduces the effects of time-varying phenomena, such as thermal gradients, from affecting opposite direction propagating electromagnetic waves differently from one another.

The electromagnetic waves which propagate in opposite directions through coil 10 are provided from an electromagnetic wave source, or light source, 11, in FIG. 1. This source is typically a superluminescent diode or, alternatively, a laser diode operating below its threshold for stimulated emission, either of which provide electromagnetic waves typically in the near-infrared part of the spectrum with a typical wavelength of 1.3 μm. Source 11 must have a short coherence length for emitted light to reduce the phase shift difference errors between these waves due to Rayleigh scattering at scattering sites in coil 10. Because of the nonlinear Kerr effect in coil 10, differing intensities in the two propagating waves can also lead to phase difference shifts therebetween. This situation can also be aided by the use of a short coherence length source for source 11 which leads to modal phase shift canceling. Rayleigh scattering and the nonlinear Kerr effect lead to non-reciprocal phase shifts between the counter rotating electromagnetic waves in coil 10 even in a minimum reciprocal configuration. A superluminescent diode, or a laser diode operating below threshold, each have a wide emission spectrum compared to that of a laser diode operating past its threshold in the stimulated emission mode of operation. In addition, such diodes introduce intensity noise into the system of FIG. 1 leading to a source of error in the output signal as will be further described below.

Between laser diode 11 and fiber optic coil 10 in FIG. 1 there is shown an optical path arrangement formed by an extension of the ends of the optical fiber forming coil 10 to some optical coupling components which separate the overall optical path into several optical path portions. A portion of polarization-maintaining or ordinary single spatial mode optical fiber is positioned against a face of laser diode 11 at a location of optimum light emission therefrom, a point from which it extends to a first optical directional coupler, 12, to be joined thereto. If, on the other hand, coupler 12 is formed by fusing two optical fibers together in a coupling region, either a pair of polarization-maintaining optical fibers or a pair of ordinary single spatial mode optical fibers, the excess length of one of the optical fibers may be positioned against diode 11 to provide this optical path between diode 11 and this wave coupling region of coupler 12, or the excess length may be spliced to another polarization-maintaining optical fiber or ordinary single spatial mode optical fiber extending from diode 11 depending, in either of these situations, on which of the coil 10 configurations described above is chosen or the choice of variations of systems having one of those configurations therein.

Optical directional coupler 12 has light transmission media therein which extend between four ports, two on each end of that media, and which are provided on each end of coupler 12 in FIG. 1. One of these ports has the optical fiber extending from laser diode 11 positioned thereagainst (or vice versa for a fused coupler, i.e. a fiber extending from the coupler coupling region to be positioned against the emitting face of diode 11). At the other port on the same end of optical coupler 12 there is shown a further optical fiber positioned thereagainst (or alternatively extending from the fused coupler if used) which extends to be positioned against a photodiode, 13, which is electrically connected to a photodetection system, 14, providing the operating circuitry therefor. This optical fiber may be a polarization-maintaining optical fiber or it may be an ordinary single spatial mode optical fiber. In practice, as indicated above, coupler 12 may be formed from fused lengths of such optical fiber so that the remaining lengths past the fused portion, or the light coupling region therein, extend either all the way to laser diode 11 and photodiode 13, or are spliced to other optical fibers extending therefrom.

Photodiode 13 detects electromagnetic waves, or light waves, impinging thereon from the portion of the optical fiber positioned thereagainst (or extending thereto) and provides a photocurrent in response. This photocurrent, as indicated above, in the situation of two nearly coherent electromagnetic waves impinging thereon, follows a raised cosine function in providing a photocurrent output which depends on the cosine of the phase difference between such a pair of electromagnetic waves, as will be shown below. Photodiode 13 is operated in either the photovoltaic mode or the photoconductive mode, as needed, into an amplifier circuit of appropriate impedance to provide a photocurrent which is substantially a linear function of the impinging radiation intensity, so that it will also have a component therein due to intensity noise emanating from source 11. Typically, photodiode 13 is a p-i-n photodiode.

Optical directional coupler 12 has another optical fiber against a port at the other end thereof which extends to a polarizer, 15. This may be polarization-maintaining or a single spatial mode optical fiber depending on choices of coil 10 configurations and system variations having one or the other of those configurations. At the other port on that same side of coupler 12 there is a non-reflective termination arrangement, 16, involving the excess length of one of the optical fibers fused together forming coupler 12 or, again, another optical fiber spliced to such an excess length. This optical fiber leading to arrangement 16 can again be polarization-maintaining optical fiber or ordinary single spatial mode optical fiber.

Directional optical coupler 12, in receiving electromagnetic waves, or light, at any port, or at any end of an excess portion of optical fiber extending past the coupling region therein, transmits such electromagnetic waves so that a preselected fraction thereof, typically one-half, appears at each of the two ports, or ends of the two excess optical fiber lengths past the coupling region, which are at the opposite end of coupler 12 from that having the incoming port or excess optical fiber length receiving the incoming waves. On the other hand, no electromagnetic waves are transmitted to the port or excess fiber length which is on the same end of coupler 12 as is the incoming port. The polarization of the incoming electromagnetic waves with respect to the principal refringent axes at the input port can be fairly well preserved at the corresponding axes of the two output ports if coupler 12 is formed of two portions of polarization-maintaining optical fiber with the principal axes suitably aligned, but there will be some coupling of waves between axes in the coupling region of the coupler. If a pair of ordinary single spatial mode optical fiber portions are fused together to form coupler 12, the polarization of the incoming electromagnetic waves with respect to the principal birefringent axes in the polarization-maintaining component can be fairly well preserved through the coupling region to the other fiber, but there may be substantial coupling thereafter even before coupled waves reach the output port of the ordinary single spatial mode optical fiber.

Polarizer 15 is used because, even in a single spatial mode optical fiber, two polarization modes are possible for electromagnetic waves passing through such a fiber along orthogonal axes. Thus, polarizer 15 is provided for the purpose of transmitting the electromagnetic wave component along one of these axes, for one of these polarization modes, between the optical fibers connected to the ports on either end thereof. At the same time, polarizer 15 substantially blocks transmission along the remaining one of these axes. Polarizer 15, however, is not capable of entirely blocking electromagnetic waves in the one state of polarization that it is intended to block. This shortcoming in the extinction coefficient thereof leads to a non-reciprocity between two opposite direction traveling waves over the optical paths they follow, and so to a non-reciprocal phase shift occurring between them which can vary with the conditions of the environment in which the polarizer and the remainder of the system of placed.

Positioned against the port of polarizer 15 on the end opposite that connected with optical directional coupler 12 is another optical fiber which extends to a further optical directional coupler, 17, this fiber and this coupler being formed of pairs of polarization-maintaining or ordinary single spatial mode fibers again depending on the choices of coil 10 configurations and system variations having one of these configurations therein. Directional coupler 17 also transmits received electromagnetic waves so that a preselected fraction thereof, again typically one-half, appears at each of the two ports which are at the opposite end of coupler 17 from that having the incoming port. Again, no electromagnetic waves are transmitted to the port or excess fiber length which is on the same end of coupler 17 as the incoming port. The polarization of incoming electromagnetic waves at an input port will be preserved at the corresponding pair of output ports to the extent and manner described for coupler 12. If directional coupler 17 is formed using a pair of portions of polarization-maintaining optical fiber, this will lead to an optical performance in the optical subsystem portion of FIG. 1 which would be similar to the performance of such a subsystem if directional coupler 17 was alternatively formed in an integrated optic chip.

The second port on the same end of coupler 17 from which the first port is coupled to polarizer 15 is connected in a non-reflective termination arrangement, 18, using a further ordinary single spatial mode optical fiber portion or a polarization-maintaining optical fiber. One of the ports on the opposite end of coupler 17 is connected to a further optical component in the optical path portion extending thereto from one end of the optical fiber in coil 10. The other port on that end of coupler 17 is directly coupled to the remaining end of optical fiber coil 10, and this coupling is typically accomplished through a splice between the excess length of an optical fiber past the coupling region in coupler 17 and the optical fiber in coil 10.

Between coil 10 and coupler 17, on the side of coil 10 opposite the directly connected side thereof, there is provided an optical phase modulator, 19. Optical phase modulator 19 has a port on either end of the transmission media contained therein which occur in FIG. 1 at the opposite ends of that phase modulator. The polarization-maintaining or ordinary single spatial mode optical fiber from coil 10 is positioned against a port of modulator 19. The polarization-maintaining or ordinary single spatial mode optical fiber extending from coupler 17 is positioned against the port on the opposite end of modulator 19.

Optical phase modulator 19 can be of the variety formed by wrapping an optical fiber portion around a piezoelectric cylinder so that the fiber may be stretched by the application of voltage to that cylinder, or this phase modulator may be formed as an optical integrated chip using a substrate of lithium niobate, for instance, with metallic depositions provided thereon as electrodes and positioned adjacent a waveguide provided therein. Such depositions typically result in plate-like electrode structures on the substrate to both provide electrical contacts to the modulator and a means through which varying electric fields can be established in the waveguide to result in the necessary modulation of the phase of electromagnetic waves passing through that waveguide.

Optical phase modulator 19 is thus capable of receiving electrical signals on these plates to cause the introduction of phase differences in electromagnetic waves transmitted therethrough by changing the index of refraction of the transmission medium, or transmission media, because of the resulting electric fields established therein to thereby change the effect of optical path lengths experienced by such waves. Optical phase modulators constructed in optical integrated circuit form have a large bandwidth, i.e. are able to provide phase changes following a waveform that has substantial high frequency content. Note also that polarizer 15, and source and loop optical directional couplers 12 and 17, could also be formed in similar integrated optic chips, including possibly being formed in a common such chip.

Directional optical coupler 17 serves as a beam-splitting apparatus in that electromagnetic waves emitted from source 11 that are transmitted through coupler 12 and polarizer 15 to be received by coupler 17 are there split in approximately half with a corresponding one of the resulting portions passing out of each of the two ports on the opposite end of coupler 17. Out of one port on that opposite end of coupler 17 the corresponding electromagnetic wave portion passes through depolarizer 10' if used, the rest of optical fiber coil 10, through optical phase modulator 19 and back to coupler 17. A portion of that electromagnetic wave passes through the port of coupler 17 leading to polarizer 15 and then to coupler 12 where a part of the remainder of the wave portion is transmitted to photodiode 13.

The other portion of the electromagnetic wave after the split in coupler 17 leaves that other port on the coil 10 end of coupler 17 to first pass through optical phase modulator 19, through most of optical fiber coil 10, and then through depolarizer 10' if used to reenter coupler 17 and, again, from there follow the same path as the first portion previously described to finally impinge in part on photodiode 13. In the presence of modulation provided by phase modulator 19, and in the presence of any rotation of coil 10 about its axis, or because of effects in coupler 17, some of the energy of the combined waves will be lost through non-reflective arrangement 18.

In an interferometric fiber optic gyroscope using polarization-maintaining optical fiber for coil 10 without a depolarizer, the electromagnetic waves passing through coil 10 are all intended to take the same optical path. In an interferometric fiber optic gyroscope using ordinary single spatial mode optical fiber for coil 10 with a depolarizer, however, the nature of the ordinary single spatial mode optical fiber used in coil 10 gives rise to random occurrences of birefringence therein induced by various causes, including stress change due to temperature changes, which result in the possibility of different optical paths being available for the waves to propagate over. The use of depolarizer 10' forces waves to differing polarization states periodically over wavelength, and so to corresponding different optical paths. Thus, the polarization history of electromagnetic waves through coil 10 and depolarizer 10' together is wavelength dependent. Nevertheless, any waves reaching the transmission axis of polarizer 15 at a point in time will have had the same polarization history. Assuming then that depolarizer 10' distributes the optical waves between the polarization states uniformly, depolarizer 10' acts to equalize the wave energy in each of the optical paths.

The choice in an interferometric gyroscope system of which of the configurations describe above for coil 10 to use will depend on many factors, as will the choice of system variations having one or the other of the coil configurations therein. A number of different system configurations for each of the coil configurations (as well as variations of those configurations) can be found in the earlier filed copending U.S. patent applications entitled "Configuration Control of Mode Coupling Errors" having Ser. No. 07/791,719 by J. Blake and J. Feth and "Configuration Control of Mode Coupling Errors" having Ser. No. 07/890,938 by J. Blake, J. Feth and B. Szafraniec each hereby incorporated herein by reference.

As indicated above, photodiode 13 provides an output current proportional to the intensity of the combined electromagnetic waves, or light waves, impinging thereon dependent on the phase difference therebetween. The arrangement of FIG. 1 leads to the electromagnetic waves propagating in opposite directions through coil 10 to in part reach photodiode 13 so that the intensity thereon is an average of the electromagnetic waves traveling in both directions over each polarization determined optical path, i.e. averaged over the wavelengths present, but including primarily only those waves propagating over those optical paths over which returning waves have a polarization at polarizer 15 which is substantially passed by that polarizer. That is, the returning waves included in the averaging process are primarily just those following optical paths which extend through the transmission axis of polarizer 15. Corresponding photocurrent from photodiode 13 follows a raised cosine function in being based on the cosine of the average phase difference between portions of each of the electromagnetic waves propagating in opposite directions in coil 10 impinging thereon taken over the wavelengths present therein. This relationship follows because the photocurrent depends on the resulting optical intensity of the pairs of opposite direction propagating electromagnetic waves incident on photodiode 13 which intensity will vary depending on how much constructive or destructive interference occurs between these waves at that diode. This interference of waves will change with rotation of the coiled optical fiber forming coil 10 about its axis as such rotation introduces a phase difference shift between the waves because of the Sagnac effect. Further, additional phase difference shifts will be introduced by optical phase modulator 19 as will be described in connection with the electrical system shown in the remainder of FIG. 1.

This situation can be shown for the system of FIG. 1 by considering in a general overview manner the clockwise and counterclockwise electromagnetic waves which propagate through that system from source 11 to photodetector 13. The waves will be considered to propagate through the system of FIG. 1 assuming that it is constructed using polarization-maintaining optical fiber without the presence of a depolarizer. In addition, common error sources such as due to different polarizations being present in the system because of the imperfection of polarizer 15 in eliminating the waves traveling along the faster propagation axis of the optical fibers by their being aligned with the blocking axis of that polarizer, backscattering at interfaces between different optical components in the system, nonlinearities in the system such as occur in the structure of phase modulator 19 or such as due to the Kerr effect in the presence of unequal intensities in the clockwise and counterclockwise waves, and the like will be assumed negligible or to have otherwise been alleviated to become insignificant in the operation of the system. One such system, for example, would be a system constructed entirely of polarization-maintaining optical fiber with a source that is sufficiently broadband in its emissions, and perhaps having intensity fluctuations of such a nature as to reduce the Kerr effect.

The electric field component of the clockwise propagating electromagnetic wave reaching photodiode 13 in photodetection system 14, $E_{d-cw}$, can be represented as $$E_{c-cw} = \frac{\sqrt{L}}{2} E_i(t-\tau)e^{-j\left(\frac{\phi_R}{2} + \phi_m'\sin\omega_m t\right)},$$

and the counterclockwise propagating wave component, $E_{d-ccw}$, as $$E_{d-ccw} = \frac{\sqrt{L}}{2} E_i(t-\tau)e^{-j\left[\frac{\phi_R}{2} + \phi_m'\sin\omega_m(t-\tau)\right]},$$

Here, $E_i$ represents the input electromagnetic electric field component from source 11 of the selected polarization with $\tau$ representing the elapsed time from leaving source 11 to reaching photodiode 13. Assuming that couplers 12 and 17 have a transfer ratio of one-half the intensity of the incoming wave, there will be a loss of $1/\sqrt{2}$ of the electromagnetic wave electric field component at each of couplers 12 and 17 so as to result in a loss of one-half of the field component in the complete trip through the system of FIG. 1 from source 11 to photodiode 13. Other losses will occur for each of the waves in passing through the system of FIG. 1 which will be essentially for each of the waves because of the "minimum reciprocal" configuration used in FIG. 1 assuring the same optical paths for both the clockwise and counterclockwise waves. These other losses are represented for each wave by $\sqrt{L}$.

The phases of the waves are represented in the complex exponents of the corresponding exponential factors in these equations. Each of the waves experiences half of the phase change, $\phi_R$, due to the Sagnac effect during rotation of the system of FIG. 1 about the symmetrical axis of coil 10 oriented perpendicular to the plane of the paper of the figure, but of opposite sign, since rotation will be in the same direction as one of the propagating electromagnetic waves but in the opposite direction to the other. The phase modulation depth, $\phi'_m$, is the same for each of the waves, but occurs later for the counterclockwise wave by time $\tau$ representing the wave transit time through coil 10 which is very close to the transit time from source 11 to photodiode 13, and so the same time is used in the sinusoid in the exponent as was used in the argument of the input radiation from source 11.

The intensity of an electromagnetic wave is, as is well known from electromagnetic theory, equal the square of the electric field component of that wave, and so the intensity of electromagnetic waves emitted by source 11 is equal to $I_i = E_i^2$. The electric field components of these magnetic waves from source 11 propagate through the system of FIG. 1 as $E_{cw}$ and $E_{ccw}$ to reach photodiode 13 of photodetection system 14 where they are additively combined so that the intensity of the electromagnetic waves impinging on photodetector 13, $I_D(t)$, is obtained from the summation of these waves, or $$I_D(t) = |E_{ccw} + E_{cw}|^2.$$

Substituting for the expressions found for electric field components of the clockwise and counterclockwise waves into this last equation and substituting the intensity of the electromagnetic waves from source 11 yields $$I_D(t) = \frac{L}{2} I_i(t-\tau) \left| e^{-j\left(\frac{\phi_R}{2} + \phi_m'\sin\omega_m t\right)} + e^{-j\left[\frac{\phi_R}{2} + \phi_m'\sin\omega_m(t-\tau)\right]} \right|^2,$$

which, with use of the well-known Euler formula and the definition of absolute value from complex variables theory and trigonometric identities, becomes $$I_D(t) = \frac{L}{2} I_i(t-\tau)\{1 + \cos\{\phi_R + \phi_m'[\sin\omega_m t - \sin\omega_m(t-\tau)]\}\}.$$

Considering just the difference in the two sine functions in the last equation, use of the substitution $\triangleq t' + \tau/2$ and trigonometric identities, permits converting this difference in functions to $$\sin\omega_m t - \sin\omega_m(t-\tau) = 2\sin\omega_m\tau/2 \cos\omega_m(t-\tau/2).$$

Use of this last equation in the preceding equation yields $$I_D(t) = \frac{L}{2} I_i(t-\tau)\left\{1 + \cos\left[\phi_R + 2\phi_m'\sin\omega_m\frac{\tau}{2}\cos\omega_m\left(t-\frac{\tau}{2}\right)\right]\right\}$$

Defining $\phi_m \triangleq 2\phi'_m \sin\omega_m\tau/2$ then gives $$I_D(t) = \frac{L}{2} I_i(t-\tau)\left\{1 + \cos\left[\phi_R + \phi_m\cos\omega_m\left(t-\frac{\tau}{2}\right)\right]\right\}.$$

This last relationship then gives the general performance of the optical subsystem in FIG. 1 as was described above.

The remaining electrical subsystem portion of FIG. 1 shows an open loop fiber optic gyroscope system, but could also be converted to a closed loop fiber optic gyroscope system, i.e. using feedback around the system shown. This would be accomplished by having the electrical system provide a feedback signal based on the output of the system shown in FIG. 1 to control a further optical phase modulator inserted in the optical path next to modulator 19, or to additionally control modulator 19. Optical phase modulator 19 is of the kind described above and is used in conjunction with a phase sensitive demodulator, or phase detector, for converting the output signal of photodiode 13 in photodetection system 14, following a raised cosine function as indicated in the last expression contained above, to a signal following a sine function which is obtained in the demodulation process from this last expression above. Following such a sine function provides, in that output signal, information both as to the rate of rotation and as to the direction of that rotation about the axis of coil 10. Modulator 19 is operated by a sinusoidal signal provided at the output of a bias modulation signal generator, 20, which also provides this signal to operate a phase detector which, as indicated, is a phase sensitive demodulator.

Thus, the output signal from photodetection system 14, including photodiode 13, is provided to an amplifier, 21, where it is amplified and passed through a filter, 22, to a phase detector, 23. The phase sensitive demodulator serving as phase detector 23 is a well-known device. Such a phase sensitive demodulator senses changes in the first harmonic, or fundamental frequency, of signal generator 20 to provide an indication of the relative phase of the pair of electromagnetic waves impinging on photodiode 13. This information is presented by phase detector 23 in an output signal following a sine function, i.e. the sine of the phase difference between the two electromagnetic wave portions impinging on photodiode 13.

Such an output signal can be found from expanding the last expression in a Bessel function series to thereby display the harmonics present in the optical subsystem output signal $I_D$. Such a series expansion gives $$I_D = \frac{L}{2} I_i(t-\tau)[1 + J_0(\phi_m)\cos\phi_R] -$$

$$2\frac{L}{2} I_i(t-\tau)J_1(\phi_m)\sin\phi_R\cos\left(\omega_m t - \frac{\omega_m \tau}{2}\right) -$$

$$2\frac{L}{2} I_i(t-\tau)J_2(\phi_m)\cos\phi_R\cos 2\left(\omega_m t - \frac{\omega_m \tau}{2}\right) -$$

$$2\frac{L}{2} I_i(t-\tau)J_3(\phi_m)\cos\phi_R\cos 3\left(\omega_m t - \frac{\omega_m \tau}{2}\right) +$$

$$\sum_{n-2}^{\infty}\left[(-1)^n 2\frac{L}{2} I_i(t-\tau)J_{2n}(\phi_m)\cos\phi_R\cos 2n\left(\omega_m t - \frac{\omega_m \tau}{2}\right) + \right.$$

$$\left. (-1)^n 2\frac{L}{2} I_i(t-\tau)J_{2n+1}(\phi_m)\sin\phi_R\cos(2n+1)\left(\omega_m t - \frac{\omega_m \tau}{2}\right)\right].$$

After conversion to an electrical output signal in photodetector system 14, this output signal must have the portion corresponding to the harmonic selected therefrom. Filter 22 is needed because bias modulation signal generator 22 also generates a strong second harmonic component, sensed by photodetection system 14, which needs to be eliminated. Filter 22 passes primarily the first harmonic frequency component from the last equation, i.e. the modulation frequency component, varying at radian frequency $\omega_m$. As a result, the output signal of filter 22 is $$v_{22} = -2k_0 \frac{L}{2} I_i(t-\tau)J_1(\phi_m)\sin\phi_R\cos\left(\omega_m t - \frac{\omega_m \tau}{2}\right),$$

where $k_o$ is the system gain constant arising because of the passage of the signal through photodetection system 14, amplifier 21 and filter 22. A further phase delay term may be added as a result of passing through this amplifier, although this will be ignored, but may be considered to be combined in the phase term shown for this cosinusoid, $-\omega_m\tau/2$.

This signal from filter 22 is then applied to phase-sensitive detector 23, as is the signal from bias modulator generator 20, the latter being equal to a sinusoid $\sin \omega_m t$ at some amplitude. The output of phase-sensitive detector 23 will then be $$v_{23} = -k'_o L I_i(t-\tau)J_1(\phi_m)\sin\phi_R,$$

where the constant $k'_o$ accounts for the further system gain resulting from the filter output signal passing through phase-sensitive detector 23.

In operation, the phase difference changes in the two opposite direction propagating electromagnetic waves passing through coil 10 in the optical paths therethrough to reach photodiode 13 will lead to average net phase difference changes which will be relatively small, and which will vary relatively slowly compared to the phase difference changes due to optical phase modulator 19 and bias modulator signal generator 20. Any average phase difference shift due to the Sagnac effect will merely shift the average phase difference between the electromagnetic waves, and the output signal from phase sensitive demodulator 23, after photodiode signal demodulation therein, will depend on the sine of this phase difference multiplied by an amplitude scaling factor set by the modulation of the waves due to phase modulator 19 and signal generator 20. This synchronous demodulation thus substantially extracts from the photodiode output signal the amplitude of the sinusoidal modulation frequency component at the modulation frequency introduced by signal generator 20 and modulator 19, which includes the result of any rotation of coil 10 about its axis, to provide the demodulator output signal.

As indicated above, however, additional phase shifts between the counter-propagating electromagnetic waves can be introduced even with the fiber optic gyroscope system in a minimum reciprocal configuration by various effects occurring therein. Typically, a significant source of such non-reciprocal phase shifts from other than the Sagnac effect is the following of different optical paths by the two different polarization components of the counter-propagating electromagnetic waves because of polarizer 15 being imperfect leading to phase shift errors in the output being distinguishable from the Sagnac phase shifts as described in the references incorporated above. Other sources are backscattering in the optical path and intensity dependence of the index of refraction along the optical paths. As was done above in the finding of the general response of the system of FIG. 1, these sources of errors will be considered either negligible or otherwise alleviated to render them negligible hereafter.

Another source of variation in the phase shifts between the counter-propagating electromagnetic waves in coil 10 leading to gyroscope output errors is due to the variation in the amplitude of the electromagnetic waves emitted by source 11 due to optical noise occurring therein. Even in the absence of noise from source 11, photodetection system 14 with photodiode 13 therein is subject to errors in the output photocurrent due to noise sources contributing thereto. In addition to the signal current, there will be present dark current noise and possible noise due to background radiation reaching photodiode 13. In addition, there will be shot noise due to the statistical nature of the photodetection process and there will be thermal noise generated in the load resistance equivalent present between the two leads of photodiode 13. Thus, in addition to these noise source currents already present in the output signal from photodetection system 14, there will be added contributions due to the optical noise generated by source 11.

There are many sources of light intensity fluctuation in the various kinds of source devices which can be used for optical source 11. All these noise sources combine to increase the detected noise above the limit set by the minimum amount of noise generated independently in photodetection system 14. This excess noise, often termed relative intensity noise, includes flicker or 1/f noise, current noise generated in the source operating electrical circuitry, and carrier density fluctuations. The intensity of the electromagnetic waves emitted by source 11 can be represented in these circumstances as $$I_i(t)=I_o+n(t),$$

where $I_o$ is a desired, and substantially constant, electromagnetic wave intensity which source 11 is operated to provide, and n(t) is the noise power which is a random variable that is the result of the contributions of the stochastic processes each noise source represents.

As higher power levels of thermal broadband light are obtained from the optical devices suitable as optical source 11, and at higher operating frequencies where 1/f noise is sufficiently diminished, another fundamental noise source begins to dominate. This is intensity noise that arises in a broadband electromagnetic wave source because of neighboring optical emitters in the source emitting optical frequency electromagnetic waves that mix with one another to leave relatively low frequency intensity fluctuations in the emitted electromagnetic waves from that source. That is, a composite electromagnetic wave arises from these emissions at any instant of time that is the sum of many independent amplified spontaneous emission events. This composite wave can be viewed as a random phasor sum of the many emitted waves since each can have a complex-value representation as a "phasor" and the relative phases of each are uncorrelated, and so the composite forms what is commonly termed as "thermal" light. Consequently, the relative phases of the various spectral components are also uncorrelated. Thus, the intensity fluctuates in time and the various relatively low frequency components of these intensity fluctuations are again uncorrelated. Such intensity noise is common from light-emitting diodes which emit at the edge thereof, and from superluminescent diodes. Laser diodes operated below threshold to obtain greater line widths than occur in stimulated emission will also exhibit intensity noise that can dominate if the operating point is not far below threshold.

The various emitters in the optical source, in each providing an output wave that beats against the others, can each be represented as a phaser with an amplitude and phase of a monochromatic or nearly monochromatic wave disturbance. The amplitude and phase of each can usually be reasonably considered statistically independent of one another and of each of the amplitudes and phases of the other phasers, but with common probability distributions for the amplitudes and phases of each.

The complex addition of the contributions of these small independent phasers provides the representation of the output of the optical source as a whole, and the result is that the source appears to emit white light in a zero mean process in addition to the desired output intensity, at least at sufficiently low frequencies, with the root-mean-square (rms) noise spectrum being given by $$n(f) = I_o \sqrt{\tau_c}$$

where $\tau_c$ is the source coherence time. Since the coherence time of the source decreases as the spectral bandwidth thereof increases, increases in the source spectral bandwidth will decrease this noise. The source coherence time, as is well known, and obtained from $$\tau_c = \int_{-\infty}^{\infty} |\gamma(\tau)|^2 d\tau$$

where $\gamma(\tau)$ is the source complex degree of coherence function. The noise power n(f) for rms averaging is related to the Fourier transformer of n(t).

As can be seen from the expression given above for the rms noise power, the noise is proportional to source intensities so that increasing the intensity will not improve the signal-to-noise ratio for the system of FIG. 1. Hence, beyond a certain intensity, typically about 10 μw where the intensity noise begins to dominate, there ceases to be any significant improvement in the signal-to-noise ratio of the system of FIG. 1 as the optical intensity of the electromagnetic waves emitted by source 11 is increased.

Since the system of FIG. 1 uses the first harmonic from the optical signal varying at a radiant frequency $\omega_m$ that is obtained from photodetection system 14 as the output signal for the system, noise signal contributions at that frequency, and frequencies nearby, will be especially important in their effects on the output signal obtained from the system. Since the output signal will only be considered within a certain bandwidth by systems in which the system of FIG. 1 is installed, set either by filters or by sampling in versions from analog-to-digital signals, or by the action of filter 22 or other band limiting actions occurring in the system of FIG. 1, the noise signal contributions of significance will only be within a relatively narrow band about the first harmonic signal frequency.

The application of white noise of zero mean applied to the input of a narrow bandwidth filter provides an output signal related to the square of the absolute value of the transfer function of the filter in the frequency domain, as is well known. Through use of the Hilbert transform, the corresponding analytic signal can be formed and through two further manipulations, too involved to be shown here, a representation of the narrow band noise at the output of the filter having a passband centered around ω can be provided in terms of envelope and phase components as $$\delta I(\omega) \cos [\omega t+\phi(\omega)].$$

The noise signal envelope is represented as the random variable $\delta I(\omega)$ and the phase component as the random variable $\phi(\omega)$. The probability distributions of these random variables, including the envelope random variable with a signal present, can be found analytically assuming the noise process is Gaussian and assuming each of these random variables to be varying at frequencies much less than the modulation frequency. These two random variables also vary slowly in time in moving form one random value to another because of the relatively long time constant resulting from the relatively narrow bandwidth of the passband. As a result, source intensity $I_i$ is now represented as $$I_i(t)=I_o\delta I_{(\omega)} \cos [\omega t+\phi(\omega)].$$

In these circumstances, the output intensity $I_D(t)$ of the optical subsystem portion of the system of FIG. 1, after substituting this last expression into the expression found above for that output signal, becomes $$I_D(t) = \frac{L}{2} \{I_o + \delta I(\omega)\cos[\omega(t-\tau) + \phi(\omega)]\} \left\{ 1 + \cos\left[\phi_R + \phi_m\cos\omega_m\left(t - \frac{\tau}{2}\right)\right]\right\}.$$

Clearly, a noise component result is added to the output signal of the optical subsystem and, as indicated above, increasing the desired intensity of emitted waves $I_o$ from optical source 11 does not change the signal-to-noise ratio of the system of FIG. 1. Thus, an arrangement is desired for use in connection with the system of FIG. 1 to reduce the effects of the optical intensity noise emanating from the optical source of that system but an arrangement that does not impose too significant a cost.

SUMMARY OF THE INVENTION

The present invention provides a noise reducer for reducing the results in a system, such as in an interferometer or a rotation sensor, of optical noise introduced by an optical source into an optical subsystem of that system, having a phase modulator therein, to result in corresponding noise signal components in the system output signal. Electromagnetic waves from a location in the optical subsystem, other than at its ouput, are coupled to a noise reduction arrangement, with any delays in that coupling being less than half those occurring in the optical subsystem from the source to the output, to form a signal therein for combining with another signal formed therein based on the optical subsystem output to reduce noise below that occurring in this last signal in the resulting system output signal.

The optical subsystem has a coiled optical fiber with electromagnetic waves propagating in opposite directions therein with the remaining portions of the optical path therethrough also formed of optical fiber, or selectively formed in part by an integrated optics chip. Electromagnetic waves are coupled from the coupling location and from the output in this subsystem to corresponding photodetectors to provide the bases for the signals combined in the noise reduction arrangement. These signals may be demodulated by a reference signal that is based on a common signal, or on separate signals, or one may be demodulated using the other as the reference signal. Waves coupled from the coupling location in the optical subsystem at some locations will require the coupling to occur through a polarizer or, if the coiled optical fiber is dispersive at the source primary frequency, also through a length of optical fiber with greater dispersion at such frequency.

BRIEF DESCRIPTION OF THE DRAWINGS

FIGS. 2a and 2b show a system schematic diagram combining a signal processing arrangement and an optical transmission path and device arrangement embodying the present invention;

DETAILED DESCRIPTION OF THE PREFERRED EMBODIMENTS

Figure 1:
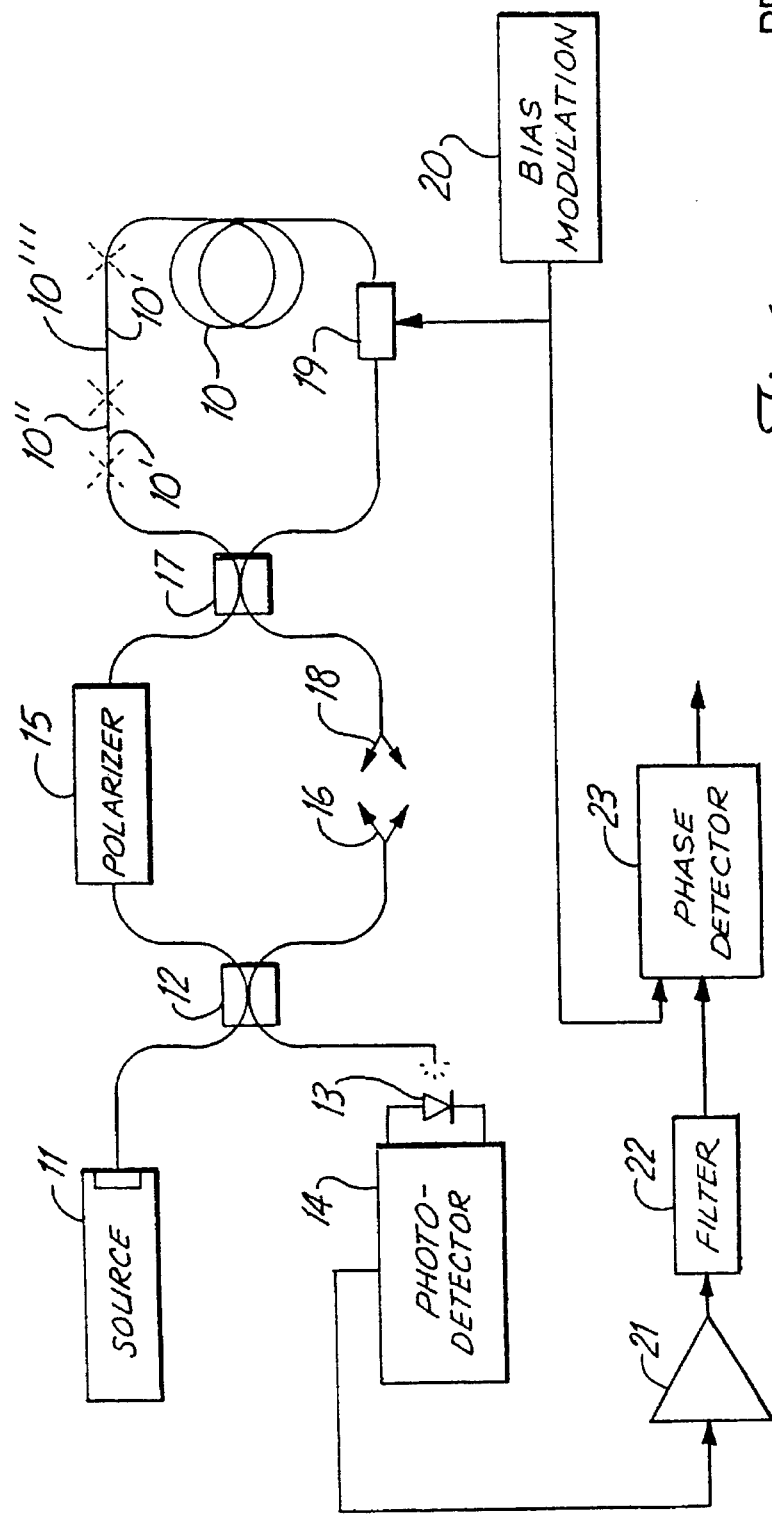
FIG. 1 shows a system schematic diagram combining a signal processing arrangement and an optical transmission path and device arrangement known in the prior art.

Reduction of the intensity noise from source 11 reaching photodetector 13, after propagating through the remainder of the optical subsystem portion of the system shown in FIG. 1, first requires somehow measuring the amount of such noise in the output signal from photodetection system 14. That information must then be used to cancel some of the corresponding noise in the output signal obtained for the system at the output of phase-sensitive detector 23.

The measurement of the errors in the optical output signal reaching photodiode 13 depends on measuring the intensity noise carried in those electromagnetic waves reaching that photodiode. However, the system of FIG. 1 provides no opportunity for doing so at a location close to photodiode 13 without also measuring the Sagnac phase shift represented in those electromagnetic waves due to any rotation of coil 10 about the axis thereof. Use of such measurements of the optical signals about to reach photodiode 13 as a basis for reducing the noise in the output signals obtained from phase-sensitive detector 23 would also reduce the rotation signal information obtained from that detector.

If, however, the intensity noise character in the electromagnetic waves reaching photodiode 13 is substantially the same as that noise in other electromagnetic waves obtained elsewhere in the system of FIG. 1, then the measurement of the noise at such other locations will approximately provide as good a basis for representing the effects of the noise from source 11 as would the electromagnetic waves about to impinge on photodiode 13. Hence, such measurements at other locations which do not have, or at least do not have much, rotation signal information therein should be as effective as a basis for determining the optical intensity noise added by optical source 11 to the electromagnetic waves emitted therefrom to the rest of the optical subsystem of FIG. 1 at least if dispersion in the optical fiber is not too significant.

One convenient location for this purpose in the system of FIG. 1 at which to obtain some of the electromagnetic waves provided by source 11 passing through that system before having much rotation information impressed thereon is at non-reflective termination arrangement 16 at which such waves are supplied through source coupler 12. The electromagnetic waves available there will be relatively intense in having passed through only one optical component in the system, source coupler 12, and so should be a relatively good measurement basis for the intensity noise content in the waves added by that source since the only rotation information therein will be that due to the very slight reflections of signals returning through source coupler 12, after passing through coil 10 enroute to photodiode 13, from the coupler splices, from source 11 and from photodiode 13. A portion of these reflections will, of course, be coupled to the port leading to termination 16. However, gain adjustments may be needed to match at least portions of the intensity noise there with the intensity noise in the signals reaching photodiode 13.

Another convenient location would be at non-reflective termination arrangement 18 of loop coupler 12. However, the electromagnetic waves measured there will have already passed through coil 10 and at least portions of them will have rotation signal information impressed thereon. Of course, if electromagnetic waves can be extracted at that location without such rotation information being contained therein, this will be a further alternative at which to measure the intensity noise content of electromagnetic waves emitted by source 11. A further difficulty would arise for such an arrangement if the optical subsystem portion of the system of FIG. 1, rather than using the all optical fiber implementation described above, instead used an integrated optics chip. In such a chip, polarizer 15, loop coupler 17 and phase modulator 19 would very likely be integrated therein. As a result, there would be no easily available termination arrangement at the equivalent of loop coupler 17, likely a waveguide "Y" junction, and so another coupling waveguide or other arrangement may need to be additionally provided in that chip to use such a location from which to obtain noise signals.

Using the intensity noise measurements in the electromagnetic waves from either location effectively in reducing such noise in the output signal from phase detector 23' first requires finding the nature of that noise in the electromagnetic waves reaching photodiode 13. The first harmonic of the optical signal falling on photodiode 13 in photodetection system 14 in the system of FIG. 1 with intensity noise absent is the desired output optical signal component, and was shown above to emerge from filter 22 as $$V_{22} = -k_o 2 \frac{L}{2} I_o J_1(\omega_m)\sin\phi_R\cos\left(\omega_m t - \frac{\omega_m \tau}{2}\right),$$

with $I_o$ substituted in place of $I_i$ here to indicate the absence of optical intensity noise. Thus, the desired output signal at the output of filter 22 in the system of FIG. 1 varies with the first harmonic of the modulation frequency as $-\cos(\omega_m t - \omega_m \tau/2)$. As a result, recovery of the amplitude of this desired harmonic requires that the signal at the output of filter 22 be demodulated by use of a signal reference that also varies as $-\cos(\omega_m t - \omega_m \tau/2)$. Hence, all those portions of the optical signal that fall on photodiode 13 when intensity noise is present to thereby provide a signal passing through filter 22 for demodulation in phase-sensitive detector 23 using such a reference signal, except that portion thereof which is the desired output signal, lead to demodulation results having significant magnitudes constituting noise in the output signal. These first harmonic noise signals thus must be found to determine the effective optical intensity noise in the output of the system of FIG. 1.

The optical subsystem output signal falling on photodiode 13 with optical intensity noise present was given above for the system of FIG. 1 as $$I_D(t) = \frac{L}{2} \{I_o + \delta I(\omega)\cos[\omega t - \omega\tau + \phi(\omega)]\}\left\{1+\cos\left[\phi_R + \phi_m\cos\omega_m\left(t - \frac{\tau}{2}\right)\right]\right\},$$

and can be seen to be the same as the optical subsystem output signal in the absence of noise, also previously set out above, if $\delta I(\omega)$ in this last equation is set to zero to effectively eliminate the noise therefrom so that $I_o$ becomes the total input $I_i$ from optical source 11. Thus, the same output signal containing the same information as to the rotation of coil 10 will be present at the output of the optical subsystem in the presence of optical intensity noise as there is in the absence of such noise, but with that optical intensity noise also additively present. Hence, the "noise only" portion of the optical subsystem signal falling on photodiode 13, or the error portion of the optical subsystem signal, can be found by setting the desired intensity output of optical source 11 $I_o$ to zero in the last equation to yield an optical error signal termed "noise error" of $$\text{noise error} = \frac{L}{2}\,\delta I(\omega)\cos[\omega t - \omega\tau + \phi(\omega)]\left\{1+\cos\left[\phi_m\cos\left(\omega_m t - \frac{\omega_m\tau}{2}\right)\right]\right\}.$$

This noise error signal expression assumes that the change in phase due to rotation because of the Sagnac effect is negligible in the situation of interest since noise makes little difference in the presence of a relatively large rotation signal.

As can be seen from this last equation, the noise error signal expression on the right of the equal sign can be separated into two parts. The first part involves just the optical intensity noise itself, as it appears outside the braces in the last expression, since there is a term equal to one within these braces, or $$\frac{L}{2}\,\delta I(\omega)\cos[\omega t - \omega\tau + \phi(\omega)].$$

The second part represents the result of various harmonics of the optical intensity noise mixing with, or beating against, the various modulation harmonics occurring in the second term within the braces resulting from the phase modulation of the source intensity, this second part being $$\frac{L}{2}\,\delta I(\omega)\cos[\omega t - \omega\tau + \phi(\omega)]\cos\left[\phi_m\cos\left(\omega_m t - \frac{\omega_m\tau}{2}\right)\right].$$

Demodulating a signal based on just the optical intensity noise by itself, as set out in the expression preceding the last as the first part of the noise error signal expression, in phase-sensitive detector 23 shows its contribution to the magnitude of the FIG. 1 system output signal that is based on the first harmonic of the optical subsystem output signal. This system output signal is obtained by demodulating, in phase-sensitive detector 23, the signal provided at the output of filter 22 as the first part of the noise error signal, and that magnitude contribution is proportional to $$\frac{L}{2} \delta I(\omega) \cos\left[\phi(\omega_m) - \frac{\omega_m \tau}{2}\right].$$

This result is found by multiplying the first part of the noise error signal equation, given just above, after setting the frequency variable $\omega$ to the first harmonic frequency $\omega_m$, by the demodulator reference signal of $-\cos(\omega_m t - \omega_m \tau/2)$, and using trigonometric identities while dropping all terms which are at frequencies higher than the first harmonic.

The second cosine factor in the second part of noise error signal, representing the phase modulation of the wave intensity provided by optical source 11 due to modulator 19 and generator 20, can be expanded in a Bessel series having only even harmonic terms therein as $$\cos\left[\phi_m \cos\left(\omega_m t - \frac{\omega_m \tau}{2}\right)\right] =$$
$$J_0(\phi_m) - 2J_2(\phi_m)\cos(2\omega_m t - \omega_m \tau) +$$
$$2J_4(\phi_m)\cos(4\omega_m t - 2\omega_m \tau) - 2J_6(\phi_m)\cos(6\omega_m t - 3\omega_g \tau) +$$

$$\sum_{n=4}^{\infty} (-1)^n J_{2n}(\phi_m)\cos(2n\omega_m t - n\omega_m \tau).$$

The various noise harmonics beat against these modulation even harmonic terms, but only those noise harmonics which have frequencies that differ from the frequency of the modulation harmonic mixed with, or beaten against, by an amount just equal to the fundamental frequency will have any significance in contributing to the first harmonic frequency signal component. This is because the new harmonics generated by the mixing process have frequencies that are the differences or sums of the frequencies of the harmonics mixed. Only those combinations of mixed harmonics which have differences between their frequencies equal to the first harmonic frequency will be demodulated to have significant magnitudes at the first harmonic frequency. Thus, only some of the combinations of the optical intensity noise harmonic frequencies beating against the modulation harmonic terms in this last expression need be considered, that is, just those involving odd noise harmonics which are the only ones which can differ in frequency from a phase modulation even harmonic by a value equal to the first modulation harmonic, i.e. the fundamental frequency.

The noise harmonic at the fundamental frequency can mix only with the terms in this last series expansion having in them $J_o$, the modulation zero frequency term, and $J_2$, the modulation second harmonic term, to yield any significant output magnitude at the first harmonic frequency. That is because these are the only two modulation harmonics with frequencies that differ from the frequency of the optical intensity noise at the first harmonic frequency by an amount equal to that first harmonic frequency. The corresponding portion of the second part of the noise error signal of interest, after substitution of the Bessel series expansion for the second cosine factor therein representing the modulation, for this first harmonic term of the noise is thus $$\frac{L}{2} \delta I(\omega_m) \{J_0(\phi_m)\cos[\omega_m t - \omega_m \tau + \phi(\omega_m)] -$$

$$J_2(\phi_m)\cos[\omega_m t - \phi(\omega_m)]\},$$

again found using trigonometric identities and dropping any terms at frequencies higher than the first harmonic. This noise error signal component would provide a contribution to the magnitude of the FIG. 1 system output signal, after demodulation by phase-sensitive detector 23, proportional to $$-\frac{L}{2} \delta I(\omega_m)\cos\left[\phi(\omega_m) - \frac{\omega_m \tau}{2}\right][J_0(\phi_m) - J_2(\phi_m)]$$

which result is again found by multiplying the expression preceding this result by the demodulator reference signal of $-\cos(\omega_m t - \omega_m \tau/2)$, and then using trigonometric identities and dropping any terms with frequencies higher than the first harmonic.

Similarly, the third noise harmonic can mix only with the second and fourth modulation harmonics to yield any significant output magnitude at the first harmonic frequency. The corresponding portion of the second part of the noise error signal of interest, again after substitution of the Bessel series expansion for the second cosine factor therein representing the modulation, for this third harmonic term of the noise is thus $$\frac{L}{2} \delta I(3\omega_m) \{J_2(\phi_m)\cos[\omega_m t + \phi(3\omega_m)] -$$

$$J_4(\phi_m)\cos[\omega_m t - \omega_m \tau - \phi(3\phi_m)]\},$$

where, once more, this result is found using trigonometric identities and dropping any terms at frequencies higher than the first harmonic. This noise error signal component would provide a contribution to the magnitude of the FIG. 1 system output signal, after demodulation by phase-sensitive detector 23, that is proportional to $$-\frac{L}{2} \delta I(3\omega_m)[J_2(\phi_m) - J_4(\phi_m)]\cos\left[\frac{\phi_m \tau}{2} + \phi(3\phi_m)\right],$$

and here, too, this result is found by multiplying the expression preceding this result by the demodulator reference signal of $-\cos(\omega_m t - \omega_m \tau/2)$, followed by the use of trigonometric identities and the dropping of any terms with frequencies higher than the first harmonic.

Thus, the finding of the first harmonic portion of the "noise error" signal can be continued through a remaining infinity of additional terms to find the additional terms therein to form the "first harmonic noise error" signal at the first harmonic modulation frequency $\omega_m$ with the initial terms thereof being first harmonic noise error =

$$+\frac{L}{2} \delta I(\omega_m)\cos[\omega_m t - \omega_m \tau + \phi(\omega_m)] +$$

$$\frac{L}{2} \delta I(\omega_m)J_0(\phi_m)\cos[\phi_m t - \omega_m \tau + \phi(\omega_m)] -$$

$$\frac{L}{2} \delta I(\omega_m)J_2(\phi_m)\cos[\omega_m t - \phi(\omega_m)] -$$

-continued $$\frac{L}{2} \delta I(3\omega_m) J_2(\phi_m)\cos[\omega_m t + \phi(3\omega_m)] +$$

$$\frac{L}{2} \delta I(3\omega_m) J_4(\phi_m)\cos[\omega_m t - \omega_m \tau - \phi(3\omega_m)] +$$

$$\frac{L}{2} \delta I(5\omega_m) J_4(\phi_m)\cos[\omega_m t + \omega_m \tau + \phi(5\omega_m)] -$$

$$\frac{L}{2} \delta I(5\omega_m) J_6(\phi_m)\cos[\omega_m t - 2\omega_m \tau - \phi(5\omega_m)]$$

$$\vdots$$

and each of these terms contributes to the portion of this noise error signal that is in phase with the demodulation reference signal $-\cos(\omega_m t - \omega_m \tau/2)$ which, after demodulation, will provide the noise error component of the output signal. The "in-phase" portion of these first harmonic noise error contribution expressions for each noise odd harmonic from the second part of the noise error signal can also be found for each of the remaining infinity of additional terms through use of trigonometric identities to form the "in-phase first harmonic noise error" signal at the first harmonic modulation frequency $\omega_m$, which will have as initial terms in-phase first harmonic noise error =

$$\left\{ +\frac{L}{2} \delta I(\omega_m)[1 + J_0(\phi_m) - J_2(\phi_m)]\cos\left(-\frac{\omega_m \tau}{2} + \phi(\omega_m)\right) - \right.$$

$$\frac{L}{2} \delta I(3\omega_m)[J_2(\phi_m) - J_4(\phi_m)]\cos\left(\frac{\omega_m \tau}{2} + \phi(3\omega_m)\right) +$$

$$\frac{L}{2} \delta I(5\omega_m) [J_4(\phi_m) -$$

$$\left. J_6(\phi_m)]\cos\left(\frac{3\omega_m \tau}{2} + \phi(5\omega_m)\right) - \ldots \right\} \cos\left(\omega_m t - \frac{\omega_m \tau}{2}\right).$$

The resulting total of these expressions is the corresponding optical error intensity signal impinging on photodiode 13 which, after conversion to an electrical signal and demodulation, will be the optical intensity error signal portion in the system output signal absent countermeasures, and this total can be written as in-phase first harmonic noise error =

$$\left\{ \frac{L}{2} \delta I(\omega_m)\cos\left[\phi(\omega_m) - \frac{\omega_m \tau}{2}\right] - \right.$$

$$\sum_{n-1(\text{odd})}^{\infty} (-1)^{\frac{n+1}{2}} \frac{L}{2} \delta I(n\omega_m)\cos\left[\phi(n\omega_m) + \frac{(n-2)\omega_m \tau}{2}\right] \times$$

$$\left. [J_{n-1}(\phi_m) - J_{n+1}(\phi_m)] \right\} \cos\left(\omega_m t - \frac{\omega_m \tau}{2}\right).$$

which can be seen to have contributions from the higher frequency noise harmonics. The bandpass limited optical intensity noise random magnitude function $\delta I(n\omega_m)$ and the phase function $\phi(n\omega_m)$ are relatively slowly, randomly varying functions of time in randomly taking various values in the probability distributions therefor, both effectively varying with time at rates on the order of the time constant set by the bandwidth of the FIG. 1 system output signal passband. Such variations will be very slow compared to transit times of electromagnetic waves and signals through the system of FIG. 1. Further, the values of these functions at the various noise harmonics are uncorrelated since the noise values at one frequency are not correlated with those at other frequencies and, hence, measurement of one harmonic at a point in time carries no implications with respect to the results of measurements at other times and other frequencies.

Nevertheless, despite these higher frequency noise harmonics, there is an opportunity to reduce or eliminate this noise after the optical signals incorporating it are converted to electronic signals and amplified to form initial system electronic output signals either before or after such signals are demodulated. This is possible as indicated above because there is direct access to the optical noise of source 11 at non-reflective termination arrangement 16 provided after source coupler 12 in the form thereof that is transmitted through coil 10 and back to photodiode 13 to thereby be incorporated into these initial system electronic output signals. Thus, this will result in such noise being reduced in the corresponding final system electronic output signals for systems based on the system of FIG. 1 despite those signal components due to such optical noise being contained in the system initial output signals provided by the portion of the system containing the optical subsystem and the conversion circuitry used to convert the optical subsystem output intensity signal to corresponding electrical or electronic signals which, before any noise cancellation being provided thereto, serve as such system initial output signals. This result is possible because such optical noise present at termination arrangement 16, as indicated above, does not have rotation information signal components therein which could result in also reducing the rotation information in the system final electronic output signals provided by any additional arrangements used for such reducing of noise in the initial output signals if such rotation components were present in the cancellation signals from termination arrangement 16 used for this purpose.

On the other hand, the optical subsystem output signals reaching photodiode 13 after emission of the underlying electromagnetic waves from source 11 have a phase delay of $\omega_m \tau/2$ with respect to phase modulator 19, as is seen from the demodulator reference signal of $-\cos(\omega_m t - \omega_m \tau/2)$ to be used to recover the desired signal with the rotation rate information as indicated above, due to the location of that modulator as one side of coil 10 and the transit time of electromagnetic waves through coil 10 of duration $\tau$. However, the optical subsystem noise signals reaching non-reflective termination arrangement 16 after emission of the corresponding electromagnetic waves from source 11 have an entirely negligible delay so that these signals at these two locations do not correspond in time to permit using the noise signals to cancel noise portions of the output signals. This can be overcome by using a second coil of the same length and nature as coil 10 extending from termination arrangement 16 to equalize the delay in the noise signals with that in the output signals, but this is an expensive solution. A desireable solution would avoid such an extra length of optical fiber, or at least add a length that is only a fraction of the length of the optical fiber in coil 10, preferably less than half that length.

One possibility would be to obtain a signal representing the noise error at termination arrangement 16 and use it to operate a feedback loop to source 11 to cancel the noise there before it is applied to the remainder of the system of FIG. 1.

However, even the very small bit of rotation signal information reflected to termination 16, if supplied as an error signal to a feedback loop, would cause that loop to act to have the source attempt to counter the presence of such information in the signal leading to removing significant rotation signal information from the output signal. In addition, the magnitude statistical fluctuations of the intensity of the electromagnetic waves provided by source 11 to the remaining portions of the FIG. 1 system may be useful in overcoming the Kerr effect, as is well known, and so canceling them before propagation through the system is not desired for this reason and possibly others. Thus, the desire is just to reduce or eliminate some of this intensity noise in the system output signal.

Obtaining a signal representing the noise error at arrangement 16 that is merely the analog thereof and combining it with the FIG. 1 system output signal to cancel the noise in that signal is also unsatisfactory since such an arrangement 16 signal will not have had the optical signal underlying it subjected to phase modulation in splitting and propagating through an interferometer loop as has the FIG. 1 system output signal. Such phase modulation on the loop leads to modulation of the intensity of the electromagnetic waves that form the optical subsystem output signal including the noise therein. The optical signal representing the first harmonic non-reflective termination arrangement 16 optical intensity noise in the narrow bandwidth centered around the first harmonic frequency $\omega_m$, $I_{nrflt16fh}$, based on the source 11 optical intensity noise representation given above, is $$I_{nrflt16fh} = k_{sctrm16}\delta I(\omega_m) \cos[\omega_m t + \phi(\omega_m)],$$

where $k_{sctrm16}$ represents the effects of source coupler 12 and any losses along the optical path to termination 16. Comparing this last equation with the preceding one for first harmonic noise error given above shows substantial differences therebetween, due primarily to the phase modulation imposed while the electromagnetic waves propagated through the interferometric optical subsystem, differences which prevent the simple combining of signals based on these intensities from providing the improvement in output signal noise sought.

Thus, the contribution of each noise harmonic that is desired to be cancelled in the FIG. 1 system first harmonic output signal must be individually measured as the basis for providing this cancellation, or some other way found for overcoming these differences. Measurements of higher frequency noise harmonics at non-reflective termination arrangement 16 quickly become uneconomical and impractical. On the other hand, of course, there will be diminishing magnitudes with increasing harmonic frequencies. Hence, economics and diminishing returns together result in selecting only a few of the first noise harmonics to be specifically used in reducing or eliminating noise from the initial output signal provided by the system of FIG. 1 if the method of measuring and canceling individual noise harmonic contributions to the first harmonic output signal is to be used.

In view of typically three-quarters or more of the noise energy often being involved with the noise first harmonic, only the two magnitude contributions due to the noise first harmonic term will be specifically chosen for cancellation in the example given here. The combination of those two contributions provides the noise error signal portion at the output of filter 22, $V_{22-ncan}$, that is to be cancelled from the output signal for the system of FIG. 1, or $$v_{22-ncan} = k_0 \frac{L}{2} \delta I(\omega_m) \cos\left[\phi(\omega_m) - \frac{\omega_m \tau}{2}\right][1 +$$

$$J_0(\phi_m) - J_2(\phi_m)]\cos\omega_m\left(t - \frac{\tau}{2}\right),$$

as obtained from the contributions of the noise by itself and from the first harmonic noise harmonic beating against the lowest frequency modulation harmonics given above. Here $k_o$ represents the effects of photodetection system 14, amplifier 21 and filter 22 as before.

The optical signal at termination arrangement 16 indicative of source 11 noise can be used to eliminate the source noise signal components contained in signal $v_{22-ncan}$ if the intensity $I_{nrflt16fh}$ at arrangement 16 chosen for this purpose is chosen so as to be representative of the noise reaching photodiode 13 and is converted to an electrical signal and then demodulated using the same reference signal frequency as is used to recover the desired signal in phase-sensitive detector 23 but with the opposite polarity phase to counter the delay difference between the termination 16 noise signal and the system initial output signal, that signal being $-\cos\omega_m(t+\tau/2)$. The resulting signal, $V_{nrflt16fh-demod}$, from such a conversion and demodulation process is $$v_{nrflt16fh-demod} = k_{sctrm16-demod}k_{sctrm16}\delta I(\omega_m)\cos\left[\phi(\omega_m) - \frac{\omega_m\tau}{2}\right].$$

The constant $k_{sctrm16-demod}$ represents the amplitude effect of the demodulator used in demodulating the electrical noise signal obtained by conversion from the optical noise signal at termination arrangement 16. The noise error portion of the output signal of filter 22 to be cancelled was given above as $V_{22-ncan}$ and is subjected to demodulation in phase-sensitive detector 23 to result in a portion of the output signal therefrom, $V_{23-ncan}$, that is to be cancelled by the signal obtained from termination arrangement 16 after conversion and demodulation thereof, and which can be written as $$v_{23-ncan} =$$

$$k_o' \frac{L}{2} \delta I(\omega_m)\cos\left[\phi(\omega_m) - \frac{\omega_m\tau}{2}\right][1 + J_0(\phi_m) - J_2(\phi_m)].$$

Here again, $k'_o$ represents the amplitude effects of photodetection system 14, amplifier 21, filter 22 and phase-sensitive detector 23. In each of these demodulations, the basic reference signal used for demodulation was $-\cos\omega_m t$, but with opposite polarity phase changes of $\omega_m\tau/2$ added thereto, with the resulting signal being multiplied by the representation of the signal to be demodulated in each instance, and with the final result obtained by using trigonometric identities and retaining only those signal components at zero frequency.

An inspection of these last two equations representing the demodulated signals for (a) the output from termination arrangement 16, and for (b) the part of the output of the system of FIG. 1 to be cancelled, shows they are similar to one another to within a gain constant. Multiplying the equation for $V_{nrflt16fh-demod}$ by a gain constant, G, to reflect applying a gain change to that signal, and adding the result to the signal for $V_{23-ncan}$, followed by setting the combined result to zero for purposes for cancellation, shows that such cancellation can be achieved if gain constant G is made equal to $$G = \frac{k_0' \frac{L}{2} [1 + J_0(\phi_m) - J_2(\phi_m)]}{k_{sctrm16} - demod k_{sctrm16}}.$$

Thus, the noise signal portion involving the noise first harmonic, the largest noise harmonic contribution, can be cancelled to significantly reduce noise in the output signal of the system of FIG. 1 without extending from termination 16 to photodiode 24 a coil of optical fiber like coil 10. If optical source 11 is operated at a sufficiently high emission intensity so that shot noise and thermal noise are relatively less significant, this will result in a major reduction in the noise in the output signal of the system of FIG. 1 as will be further shown below.

This last result also assumes that a low dispersion-length product optical fiber is used in coil 10, at least at the primary frequency of source 11, since significant dispersion at that frequency will change the nature of the noise at photodiode 13 from the nature it had at its emission from source 11. If coil 10 does have significant dispersion at the source primary frequency, an optical fiber length providing dispersion equal thereto may have to be extended from termination 16 to photodiode 24 so the noise has the same nature at each of these photodiodes, although this length need not be anywhere near to equal to that of the fiber in coil 10 if it is provided by an optical fiber having a much higher dispersion at the source primary frequency. Typically, such a length will be less than half of the length of the fiber in coil 10, and ususally much less.

FIG. 2A shows the system of FIG. 1 modified to provide this cancellation, and items shown in the system of FIG. 2A that are similar to corresponding items in the system of FIG. 1 have the same numerical designations there as they had in FIG. 1 including the various devices, transmission paths and blocks. Non-reflecting termination arrangement 16 in the system of FIG. 1 is not used in the system of FIG. 2A, and so the output of source coupler 12 on the polarizer 15 side thereof, which ended in termination arrangement 16 of FIG. 1, has been redesignated 16' as an optical signal carrier to bring the optical intensity signal thereat to a further photodiode, 24, of a type similar to that used for photodiode 13.

To assure that the optical noise components reaching termination 16' are proportionate to those passing through coil 10 to thereafter reach photodiode 13, source coupler 12 may for example be chosen to be formed of a pair of polarization-maintaining optical fibers so that electromagnetic waves propagating along a principal birefringent axis in one of member of the pair will primarily couple in the coupling region therein to the corresponding one of the pair of principal birefringent axes in the other. If source 11 has a highly polarized emitted wave output that is aligned with the principal birefringent axis of such a source coupler that is also aligned with the pass axis of polarizer 15, nothing more need be done to assure that the noise intensities at each of photodiodes 13 and 24 due to the source optical noise intensity are proportional. If, however, the emitted wave intensity of source 11 is not so highly polarized so that there are substantial wave intensities emitted into both principal birefringent axes of source coupler 12, a polarizer must be used at termination arrangement 16' to select the intensity from that principal birefringent axis there that is coupled in the coupling region of coupler 12 to the principal birefringent axis in the other fiber that is aligned with the pass axis of polarizer 15. Such a polarizer is shown in the dashed line box forming part of termination arrangement 16' in those situations in which it is needed (which may also contain a length of optical fiber that is highly dispersive at the source primary frequency if coil 10 is dispersive at that frequency).

Photodiode 24 is operated by a photodetector operating circuit arrangement, 25, which may be of the type similar to that used in operating photodetection 14. The output of photodetector operating arrangement 25 is provided to a phase detector, 26, which again can be a phase-sensitive detector similar to that of phase detector 23. The reference signal for phase detector 26 is obtained from bias modulation generator 20 just as it is for phase detector 23. However, as shown above, phase adjustments will be required to this signal as shown by the factors $-\cos \omega_m(t+\tau/2)$ and $-\cos \omega_m(t-\tau/2)$, respectively, if $\omega_m\tau \neq \pi$. As a result, two phase adjusters, 27 and 28, are shown being operated by bias modulation generator 20. Phase adjuster 27 adjusts the phase of the output signal of bias modulation generator 20 before it is applied as a reference signal to phase detector 23, and phase adjuster 28 provides the same function with respect to phase detector 26. The use of two independent phase adjusters also allows independent phase adjustment to correct any other delay differences which may occur. Alternatively, a phase recovery circuit operating on the output signal provided by amplifier 21 may be used to provide the reference signal for demodulation to phase detectors 23 and 26.

The output of phase detector 26 is applied to a gain adjuster, 29, which can be used to change the magnitude of the signal provided from phase detector 26 so that it has the proper value for canceling the first noise harmonic signal portion of the initial system output signal provided from phase detector 23 desired for cancellation, as described above. That is, the value for gain constant G described above can be set in gain adjuster 29.

The magnitude adjusted noise signal first harmonic in gain adjuster 29 and the system initial output signal from phase detector 23 are provided to a combiner, 30, which algebraically combines these two signals. As shown above, providing the proper phase adjustments for the signals in phase detectors 23 and 26, and providing the proper gain adjustment to the output signal of phase detector 26, will result the desired cancellation occurring in combiner 30. The resulting signal provided at the output of combiner 30 then becomes the system signal for use in subsequent system portions using such rotation information. If the system of FIG. 2A is to be formed as part of a closed loop gyroscope arrangement as described above, the system output signal from combiner 30 is used to close the loop rather than the initial system output signal from phase detector 23.

Figure 2B:
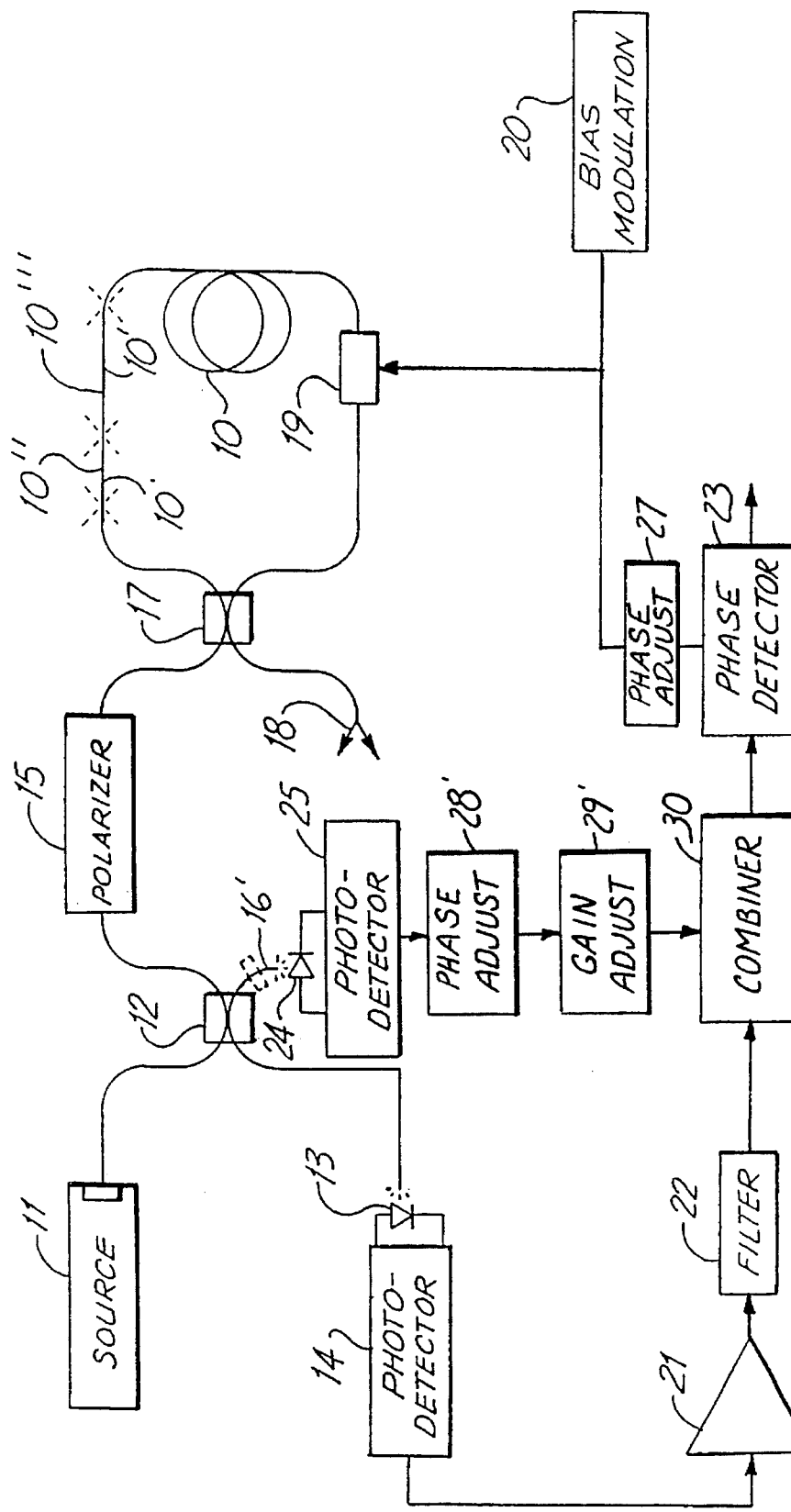

As an alternative to the system of FIG. 2A, one less phase detector can be used if the magnitude adjusted noise signal first harmonic from gain adjuster 29 is combined with the system initial output signal from phase detector 23 prior to either of these signals passing through a phase detector. Rather, this signal combining can be done first to thereafter be followed by transmitting the result to a phase detector. The resulting system is a simplified implementation as shown in FIG. 2B. The items shown in the system of FIG. 2B that are similar to corresponding items in the systems of FIGS. 1 and 2A have the same numerical designations there as they had in FIGS. 1 and 2A.

The signal at the output of photodetector 22 is unchanged in the system of FIG. 2B from the signal occurring at the output of the same filter in FIG. 2A, or $$V_{22-ncan} = k_0 \frac{L}{2} \delta I(\omega_m) \cos\left[\phi(\omega_m) - \frac{\omega_m \tau}{2}\right][1 +$$

$$J_0(\phi_m) - J_2(\phi_m)]\cos\omega_m\left(t - \frac{\tau}{2}\right).$$

The optical intensity noise in the narrow band centered around the first harmonic frequency $\omega_m$ is again given by $$I_{nrflt16} = k_{sctrm16} \delta I(\omega_m) \cos[\omega_m t + \phi(\omega_m)].$$

As can be seen in FIG. 2B, the electrical representation of this noise signal is supplied from the output of photodetector operating circuit arrangement 25 to a phase adjustor, 28', to alter the phase thereof. The result is $$V_{28'} = k_{sctrm16:phsadj} k_{sctrm16} \delta I(\omega_m) \cos[\omega_m t + \phi(\omega_m) - \theta_{28'}],$$

where $K_{sctrm16:phsadj}$ represents the conversion of the electromagnetic wave intensity falling on photodiode 24 being converted to a voltage signal, the effect of the electronics in photodetector operating circuit arrangement 25, and the amplitude effect occurring in phase adjuster 28'. The phase change due to phase adjuster 28' is represented by $\theta_{28'}$. Through the use of trignometric identities, the "in-phase" portion of this signal can be found as $$V_{28':in\text{-}phase} =$$

$$k_{sctrm16:phsadj} k_{sctrm16} \delta I(\omega_m) \sin\left[\phi(\omega_m) - \frac{\theta_{28'}}{2}\right] \sin\left[\omega_m t - \frac{\theta_{28'}}{2}\right].$$

If $\theta_{28'}$ is chosen to be equal to $\omega_m \tau + \pi$, this in-phase signal becomes $$V_{28':in\text{-}phase} =$$

$$k_{sctrm16:phsadj} k_{sctrm16} \delta I(\omega_m) \sin\left[\phi(\omega_m) - \frac{\theta_{\omega_m \tau}}{2}\right] \sin\left[\omega_m t - \frac{\theta_{\omega_m \tau}}{2}\right].$$

using appropriate trignometric identities.

Once again, an inspection of this last equation representing the output from termination arrangement 16 after phase adjustment and the equation representing the signal at the output of filter 22, shows they are similar to one another to within a gain constant. Thus, once again, multiplying this last equation by a gain constant, G, to reflect the effect of a gain adjuster, 29', being used to adjust the magnitude thereof, and setting the combined result to zero for purposes of cancellation and to reflect the effects of combiner 30, shows that the desired cancellation can be achieved if gain constant G is made equal to $$G = \frac{k_0 \frac{L}{2}[1 + J_0(\phi_m) - J_2(\phi_m)]}{k_{sctrm16:phsadj} k_{sctrm16}}.$$

Thus, once again, the same cancellation result is achieved in the same circumstances as is achieved with system FIG. 2A.

Note that making the choice of operating phase modulator 19 at the proper frequency $\omega_m = \pi/\tau$, the output signal of the amplifier 22 becomes $$V_{22-ncan} = k_0 \frac{L}{2} \delta I(\omega_m)[1 + J_0(\phi_m) - J_2(\phi_m)]\sin\phi(\omega_m)\sin\omega_m t,$$

where trignometric identities have been used. Comparing this signal to the signal found above for $V_{28':in\text{-}phase}$ before making any choice shows that the two sinusoidal factors therein will be equal to the sinusoidal factors in the last equation by setting $\theta_{28'}$ equal to zero. Thus, at the proper frequency, phase adjuster 28' can be eliminated assuming there is no significant difference in phase introduced into the signals arriving at combiner 30 after their generation in photodiodes 13 and 24.

Having completed this cancellation of the first noise harmonics in combiner 30 that were in the initial system output signal provided by phase-sensitive detector 23, the final output signal of the system of FIG. 2A, or of the system of FIG. 2B, has a noise signal portion therein arising from the remaining portion of the first harmonic error intensity impinging on photodiode 13 which is not converted to a signal to be cancelled. This remaining first harmonic noise error in the signal at the output of combiner 30, $v_{30-nrmn:1}$, after demodulation in demodulator 23 and the cancellation in combiner 30 is $$V_{30-nrmn:1} = \sum_{n=3(odd)}^{\infty} k_o'' (-1)^{\frac{n+1}{2}} \frac{L}{2} \delta I(n\omega_m)\cos\left[\phi(n\omega_m) + \frac{(n-2)\omega_m \tau}{2}\right] \times [J_{n-1}(\phi_m) - J_{n+1}(\phi_m)],$$

where $k_o''$ represents the cumulative effects of amplifier 21, filter 22, demodulator 23 and combiner 30. As shown above, the phase modulation of the source intensity for improving the detection of rotation information yields a resulting intensity for very low rotation rates that contains even harmonics of the modulation frequency. As also shown above, these even harmonics mix with the source intensity noise occurring at the odd harmonics of the modulation frequency to result in being detected as corresponding contributions of noise at the output signal of the system. However, since the source intensity noise at different odd harmonics of the modulation frequency are uncorrelated, as indicated above, the mixing just indicated gives rise to uncorrelated noise components at the modulation frequency in the system output signal. Thus, the remaining first harmonic noise error is effectively formed by a random phaser sum of such noise contributions.

As is well known for such random phaser sums, the total root-mean-square average noise power is the root-sum-square of the contributing noise component powers. Noting that the average of the square of a cosine is equal to one-half, and that $\delta I(n\omega_m)$ is a constant, taken to be $\eta$, if the intensity noise is white noise as indicated above, the root-mean-square average of the remaining intensity noise is $$\sqrt{\overline{(v_{30-nrmn:l})^2}} =$$

$$\left\{ \frac{1}{2} \left[ k_o" \frac{L}{2} \eta \right]^2 \sum_{n=3(odd)}^{\infty} [J_{n-1}(\phi_m) - J_{n+1}(\phi_m)]^2 \right\}^{1/2}$$

The desired signal with significant rotation information contained therein was given above as being proportional to $J_1(\phi_m)$ so that one can see that the signal-to-noise ratio can be affected by the choice of the values for the magnitude of the phase modulation $\phi_m$. This ratio can be maximized by minimizing the value of its reciprocal, and so the signal-to-noise ratio can be maximized through minimizing $$\frac{\sqrt{[J_2(\phi_m) - J_4(\phi_m)]^2 + [J_4(\phi_m) - J_6(\phi_m)]^2 + [J_6(\phi_m) - J_8(\phi_m)]^2 + \ldots}}{J_1(\phi_m)}$$

However, as earlier noted, there are further noise contributions to the output signals in the systems of FIGS. 1, 2A and 2B, particularly including shot noise in photodiode 13 and circuit noise in the circuitry immediately adjacent this photodiode in photodetection system 14. As a result, the root-mean-square average total remaining noise, $v_{30-nrmn:t}$, should be written as $$\sqrt{\overline{(v_{30-nrmn:l})^2}} = \sqrt{\overline{(v_{30-nrmn:l})^2} + [\text{shot noise}]^2 + [\text{circuit noise}]^2}$$

As is well known, shot noise, due to the statistical nature of photodetection process, expressed as average noise power per square root of frequency, is given as $2eI_{o-1p}$ where $e$ is the electronic charge and $I_{o-1p}$ is the source intensity around zero signal frequency, i.e. after passing source intensity $I_o$ through a lowpass filter having a frequency break below the fundamental frequency. Since expressions given above for the optical intensity show this portion of the source optical intensity is related to $J_0(\phi_m)$, an optimum value for the phase modulation magnitude $\phi_m$ must take into account shot noise if it is a sufficiently significant fraction of the intensity noise. Circuit noise is independent of the phase modulation magnitude $\phi_m$.

Figure 3:
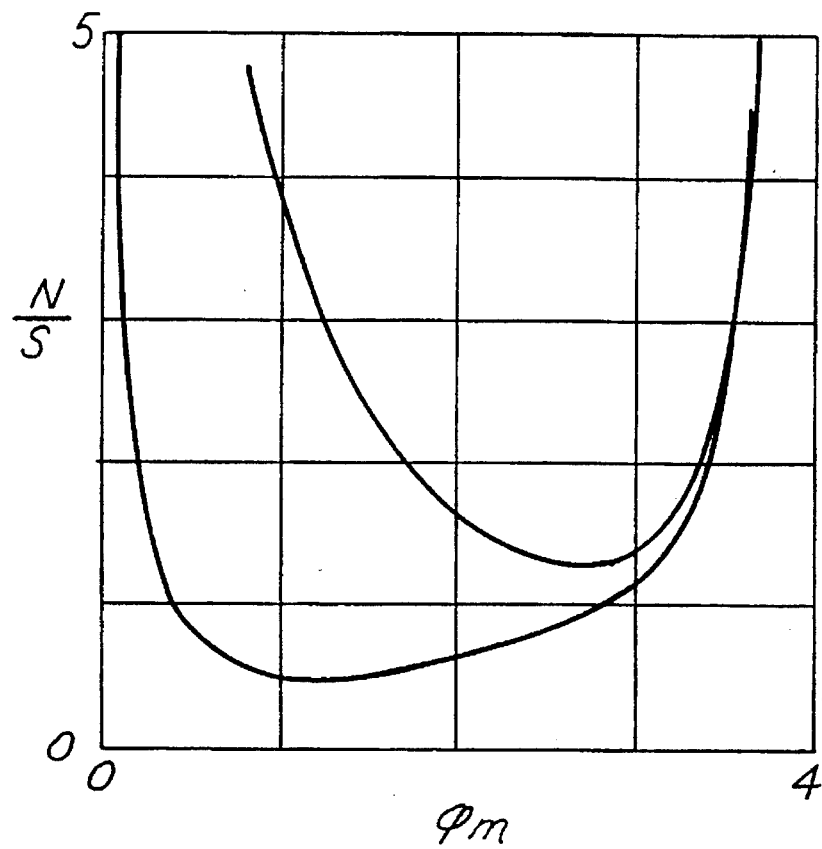
FIG. 3 shows a graph of a performance characteristic for the systems of FIGS. 1 and 2.
Figure 4:
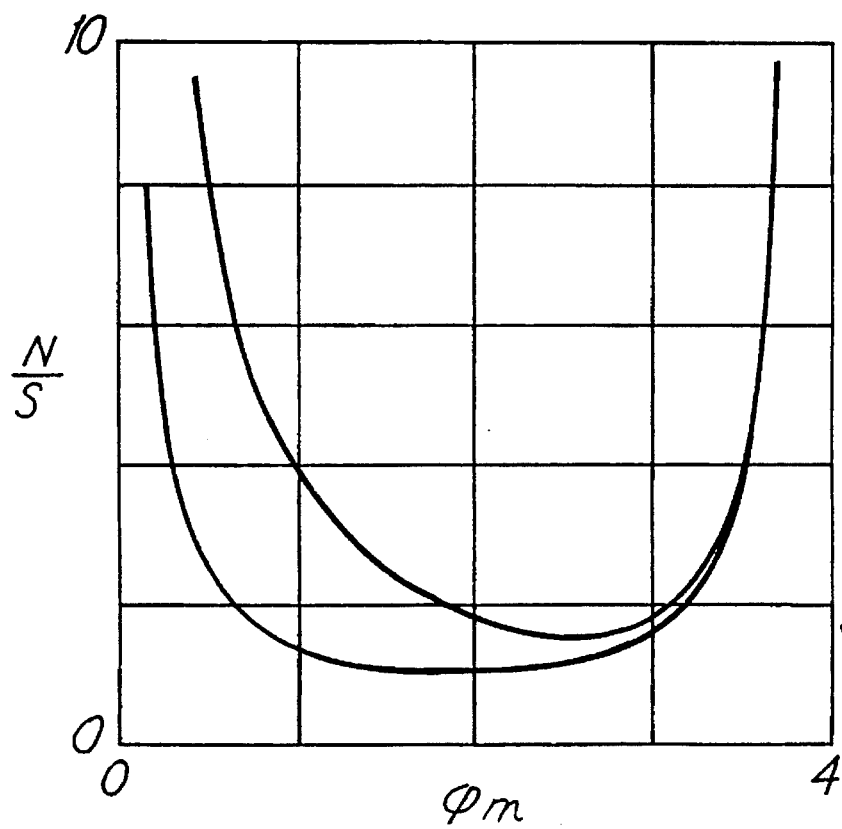
FIG. 4 shows a graph of a performance characteristic for the systems of FIGS. 1 and 2.

An indication of the optimum value situation in these more complete noise circumstances is given in the graphs of FIGS. 3 and 4 plotting the system noise-to-signal ratio against the phase modulation magnitude $\phi_m$ for shot noise power being a hundredth and a tenth of the optical intensity noise power, respectively, and using 5 terms in the last set out infinite series. There are shown two graphs in each figure, the upper one shown for the situation in which no optical intensity noise is being cancelled as in the system of FIG. 1, and the lower one for the optical intensity noise cancellation described above for either of the systems of FIGS. 2A or 2B being used. As can be seen, even in the absence of such intensity noise cancellation, a minimum value for the system noise-to-signal ratio can be obtained for the proper value choice for $\phi_m$. Use of such noise cancellation permits obtaining an even lower minimum value for this ratio at a lower value for $\phi_m$ which is more desirable choice for $\phi_m$ because of the other effects this choice has on the system. Thus, smaller values for $\phi_m$ reduces the extremes at which phase modulator 19 and generator 20 must be operated thereby reducing the deleterious effects due to imperfections therein such as unwanted second harmonic generation and unwanted polarization modulation, reduces nonlinearities in at least some implementations of the systems of FIGS. 2A and 2B, and reduces problems in the controller used to set and maintain a value for $\phi_m$.

Again considering the optical noise of source 11 at non-reflective termination arrangement 16 provided following source coupler 12, not only is the optical signal $I_{nrflt16fh}$ available representing the first harmonic non-reflective termination arrangement 16 optical intensity noise in the narrow bandwidth centered around the first harmonic frequency $\omega_m$, but so are those optical signals available at that location for other odd harmonics. Thus, optical signals can be obtained at that location for noise centered in narrow bandwidths about the other odd harmonics also to thereby form a noise signal representing the noise in the narrow bands around each of the odd harmonics, $I_{nrflt16oh}$, which can be written as $$I_{nrflt16oh} = k_{scirm16}[\delta I(\omega_m)\cos[\omega_m t + \phi(\omega_m)] + \delta I(3\omega_m)\cos[3\omega_m t + \phi(3\omega_m)] + \delta I(5\omega_m)\cos[5\omega_m t + \phi(5\omega_m)] + \ldots].$$

This optical noise signal exists in the total noise signal provided by the source optical intensity noise and matches the noise selected from that total noise signal to affect the output signal by the signal processing in the system of FIG. 1 and by the bandwidth of the systems into which the output signal of the system of FIG. 1 is provided.

Returning to the "in-phase first harmonic noise error" signal set out above in the form of an expanded partial series of constituent terms, the negative of that FIG. 1 system output optical noise signal converted to an electrical signal can be reproduced by multiplying (demodulating) this last optical noise signal $I_{scirm16oh}$, after conversion to an electrical signal, by a generated signal properly constructed to give this desired result. This requires subjecting the signal resulting from such multiplication to lowpass filtering to remove frequencies higher than the first harmonic. Such a constructed signal for this purpose, designated "generated construct" in the following expression therefor, is generated construct =

$$k_{gen} \left\{ [1 + J_o(\phi_m) - J_2(\phi_m)]\cos\left(\omega_m t + \frac{\omega_m \tau}{2}\right) - [J_2(\phi_m) - J_4(\phi_m)]\cos\left(3\omega_m t - \frac{\omega_m \tau}{2}\right) + [J_4(\phi_m) - J_6(\phi_m)]\cos\left(5\omega_m t - \frac{3\omega_m \tau}{2}\right) - \ldots \right\}.$$

Thus, this generated construct signal will have a waveform which is determined by values chosen for the parameters $\omega_m$, $\omega_m$ and $\tau$, and constructing such a waveform for the choices made of these parameters, demodulating the noise obtained at non-reflective termination 16, and combining it with the output signal will result in completely canceling the effect of optical intensity noise introduced by source 11. The phase arrangements necessary for countering the phase delay difference between the noise signals at termination 16' and the system initial output signals is implicit in this generated construct signal.

However, as this generated construct signal is developed in the foregoing in infinite series form, as a practical matter a generated construct signal will be formed approximately by retaining only the significant terms from the series which, since each series term is formed from a harmonic component, will result in a harmonic waveform with a repeated cycle therein, i.e. a periodic waveform. Thus, the waveform of such an approximate generated construct signal for demodulating the noise at non-reflective termination 16 can be found from keeping the first five or six terms of the series, determining the waveform of a cycle, and storing that waveform in a memory which is accessible to a microprocessor to enable that microprocessor to generate the approximate generated construct signal by repetitively providing the stored cycle waveform. The resulting system is shown in part in FIG. 5, and again items shown in the system of FIG. 5 that are similar to corresponding items in the systems of FIGS. 1, 2A and 2B have the same numerical designations there as they had in FIGS. 1, 2A and 2B.

Figure 5:
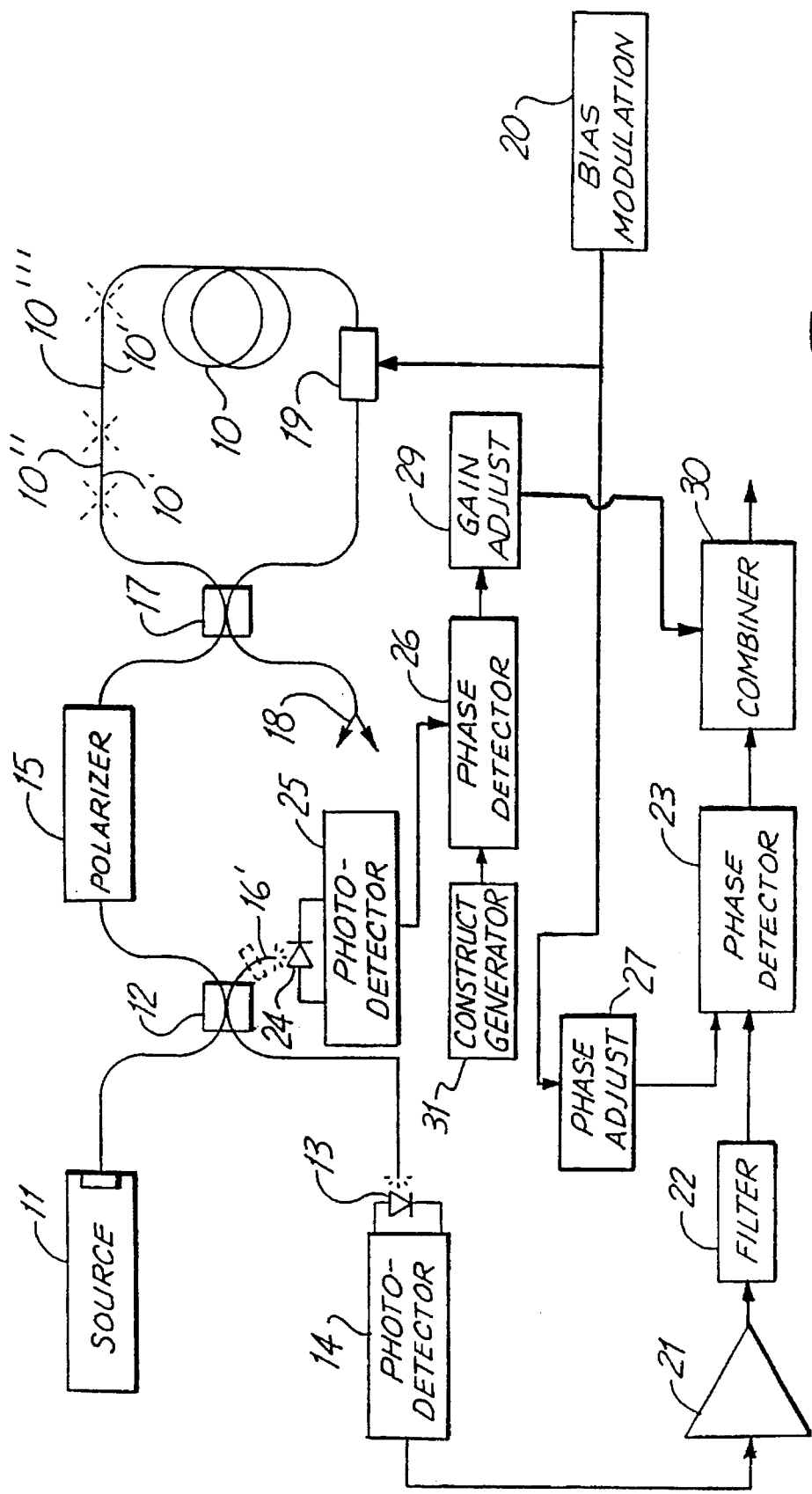
FIG. 5 shows an alternative system schematic diagram combining a signal processing arrangement and an optical transmission path and device arrangement embodying the present invention.

In FIG. 5, a generator, 31, for providing the generated construct signal is now shown connected to phase detector 26 rather than having bias modulation generator 20 being connected thereto through phase adjuster 28. Each of phase detectors 23 and 26, as usual, have lowpass filters at the outputs thereof with the cutoff below demodulation frequency $\omega_m$ although a single lowpass filter could instead be provided after combiner 30. As a further alternative, phase detector 23 could be provided in the output signal path after combiner 30 instead of before, as shown in the system of FIG. 2B. Gain adjuster 29 is again used to provide an adjustment to the amplitude of the demodulated construct signal to result in the desired cancellation of the output noise signal portion of the output signal from phase detector 23, which here should be $$G = \frac{k_o' \frac{L}{2}}{k_{gen}k_{sctrm16-demod}k_{sctrm16}}.$$

Note that the results shown in FIG. 2A, for instance, can be obtained in the system of FIG. 5 by choosing, as the waveform output of construct generator 31, a cosine waveform at modulation frequency $\omega_m$ with an amplitude proportional to $1+J_o(\phi_m)-J_2(\phi_m)$ and a phase of $\omega_m\tau/2$.

Figure 6A:
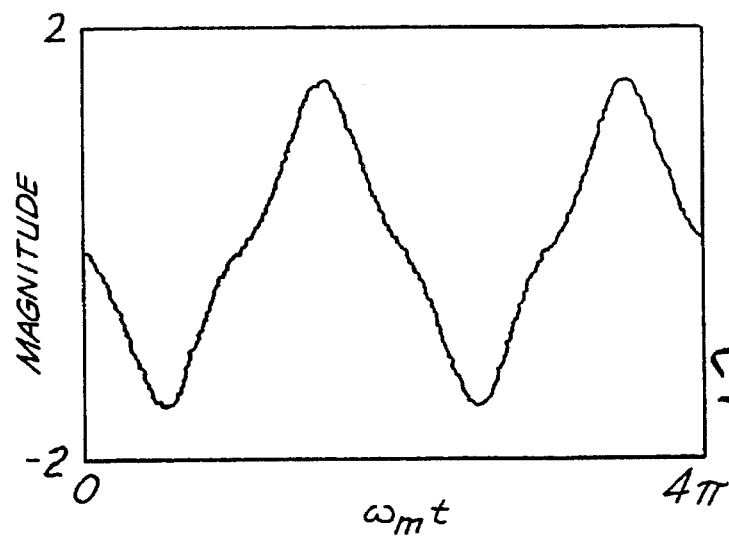
FIG. 6A shows a graph of a portion of a periodic waveform.

As a further practical matter, fewer than five or six terms in the series may be used in forming the waveform as the bandwidth of the generator used to construct the waveform, or of the signal processing system connected to photodetector 13, or both, may not respond to such higher frequency terms. Such approximations are not crucial since there will be other noise present such as shot noise, as indicated above, which will not be overcome by the arrangement shown in FIG. 5. Further support for the conclusion that approximations of the generated construct signal are acceptable can be found from the results obtained in making somewhat greater approximations. Thus, if the modulation frequency is chosen to be half of the proper frequency, or $\omega_m\tau = \pi/2$, and the modulation depth $\phi_m$ being at 1.5 radians, the generated construct signal based on the first five terms of this series will be periodic with a cycle waveform like that shown in FIG. 6A ignoring multiplicative constants, that is, a cycle waveform which is very close to a triangular waveform.

Figure 6B:
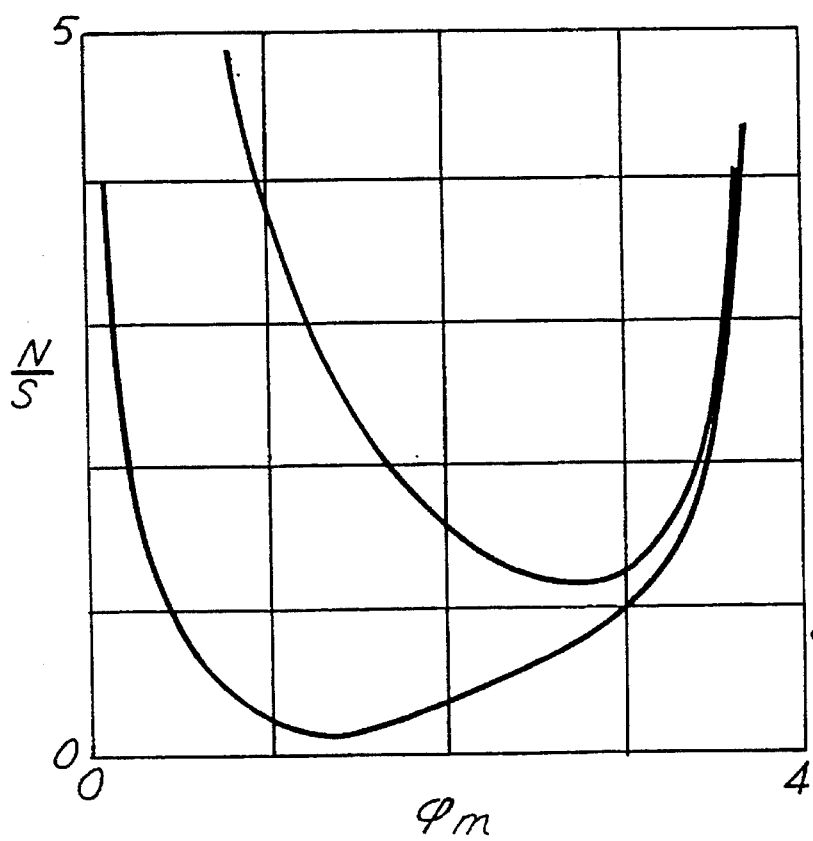
FIG. 6B shows a graph of a performance characteristic for the system of FIG. 5.

If, for cost or convenience reasons, such a triangular wave is just used instead as the constructed waveform to be provided by construct generator 31 in demodulating the noise signal obtained from photodetector 24 at termination arrangement 16', the resulting noise-to-signal ratio of the system of FIG. 5 is shown in the graph of FIG. 6B as plotted against the phase modulation magnitude $\phi_m$ for shot noise being one-fiftieth of the optical intensity noise. Again, there are two graphs in FIG. 6B, the upper one shown for the situation in which there is no optical noise intensity being cancelled and the lower one for the situation in which optical intensity noise is cancelled in the system of FIG. 5 using the triangular wave from generator 31. Clearly, subtraction of the optical intensity noise provides a very substantial improvement despite the approximation of a triangular wave for the waveform shown in FIG. 6A.

Figure 7A:
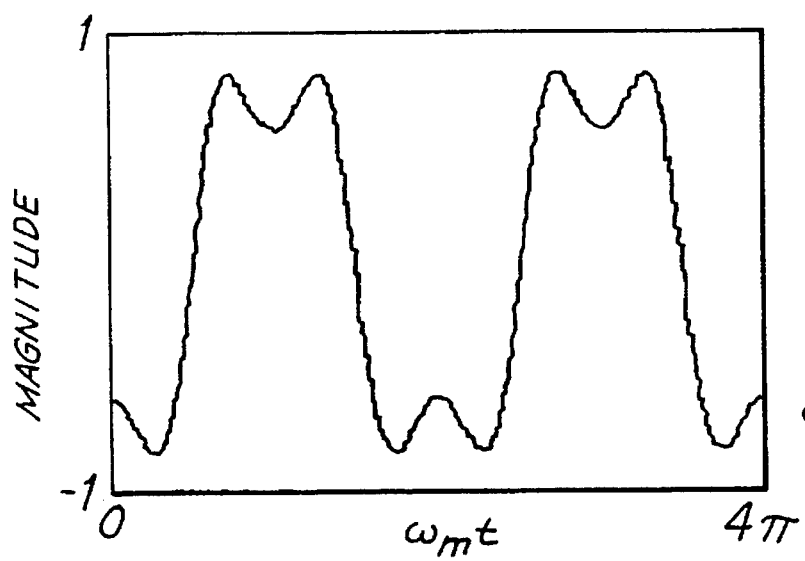
FIG. 7A shows a graph of a portion of a periodic waveform.
Figure 7B:
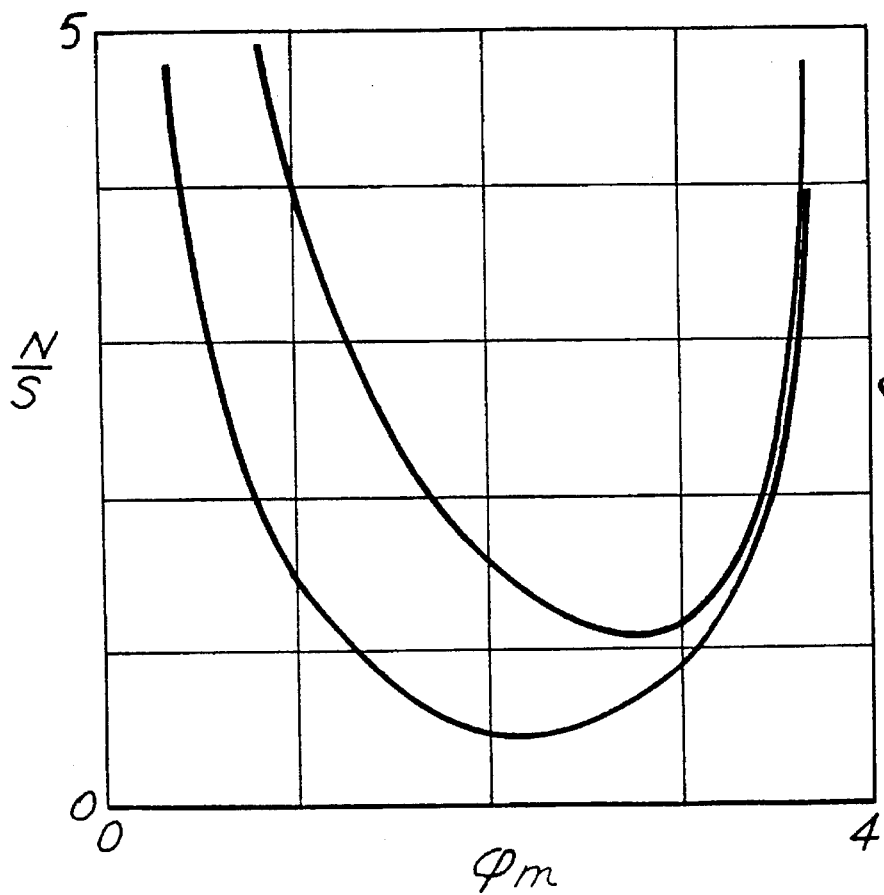
FIG. 7B shows a graph of a performance characteristic for the system of FIG. 5.

As a further example, operating with a modulation frequency that is quite low compared to the proper frequency, or is at the proper frequency, will yield a generated construct waveform which looks something like a square wave. Choosing this specific example of operating at the proper frequency so that $\omega_m\tau = \pi$, and choosing the modulation depth as $\phi_m = 2$, the generated construct waveform using five terms from the series will again be periodic as shown in FIG. 7A where two cycles of the waveform are shown, again ignoring multiplicative constants. Approximating this waveform with a square wave, and having such an approximating wave provided by construct signal generator 31 in the system shown in FIG. 5, results in a plot of the system-to-signal ratio against phase modulation magnitude $\phi_m$ for that system shown in FIG. 7B, with the shot noise again present with a power that is one-fiftieth of that of the optical intensity noise power. The lower curve again is for use of the cancellation arrangement described in connection with FIG. 5, and the upper curve represents a situation in the absence of any such cancellation. Again, there is an improvement offered by the use of the cancellation system in FIG. 5 despite the relatively crude approximation of the waveform in FIG. 7A by a square wave, although not as substantial an improvement as shown using a triangular wave described in connection with the results shown in FIG. 6B. Note that when operating at the proper frequency, phase adjuster 27 can be eliminated since the modulation factor $\cos(\phi_m t - \omega_m\tau/2)$ becomes $\sin \omega_m t$, the very waveform provided by bias modulation generator 20. If operation of the system of FIG. 1 is to be at the proper frequency, however, a more effective means exists for canceling entirely the optical intensity noise induced by source 11 as will now be described.

As is shown above, the optical subsystem of the system of FIG. 1 leads to electromagnetic waves impinging on photodetector 13 with an intensity of $$I_D(t) = \frac{L}{2} I_i(t-\tau) \left\{ 1 + \cos\left[\phi_R + \phi_m \cos \omega_m \left(t - \frac{\tau}{2}\right)\right] \right\}.$$

The noise introduced by source 11 was most generally given above as $$I_i(t) = I_o + n(t).$$

Substituting the latter expression into the one preceding it, the following result is obtained $$I_D(t) = I_o \frac{L}{2} \left\{ 1 + \cos\left[\phi_R + \phi_m \cos\omega_m \left(t - \frac{\tau}{2}\right)\right] \right\} +$$
$$n(t-\tau)\frac{L}{2} \left\{ 1 + \cos\left[\phi_R + \phi_m \cos\omega_m \left(t - \frac{\tau}{2}\right)\right] \right\}$$
$$= I_o g(t) + n(t-\tau)g(t)$$

for

-continued
$$g(t) \stackrel{\Delta}{=} \frac{L}{2} \left\{ 1 + \cos\left[ \phi_R + \phi_m \cos \omega_m \left( t - \frac{\tau}{2} \right) \right] \right\},$$

where the phase modulation waveform is sinusoidal, but which would be true for the g(t) resulting from any kind of phase modulation waveform.

Non-reflective termination arrangement 16' has the optical intensity noise signal $I_{nrflt16}$ become available there after transmission through source coupler 12, as described above, to give an optical noise signal of $$I_{nrflt16} = k_{sctrm16} I_i(t) = k_{sctrm16} I_o + k_{sctrm16} n(t)$$

where $k_{sctrm16}$ represents, as before, the effects of source coupler 12 and any losses along the optical path to termination 16. The time of transmission from source 11 to termination 16 is assumed to be negligible as it occurs over a very short optical path relative to the transmission path through coil 10.

Consider demodulating the variable part of the optical noise signal obtained in non-reflective termination arrangement 16, $k_{sctrm16} n(t)$, after conversion to an electrical signal, by the optical subsystem output signal $I_D(t)$ impinging on photodiode 13 after it also is converted to an electrical signal. The variable part of the optical noise signal at non-reflective termination arrangement 16 can be obtained after conversion to an electrical signal by use of a blocking capacitor between the conversion apparatus and the demodulator, or multiplier, that is being used thus yielding the signal $k_{sctrm16cnv} I_i(t)|_{variable}$. The optical subsystem output signal after conversion can be taken at the output of filter 22 to yield $v_{22} = k_o I_D(t)$. The result of multiplying these two signals is $$\begin{aligned} v_{22} k_{sctrm16cnv} I_i(t)|_{variable} &= k_o I_{D(t)} k_{sctrm16cnv} k_{sctrm16} n(t) \\ &= k_o I_o k_{sctrm16cnv} k_{sctrm16} n(t) + \\ &\quad k_o n(t-\tau) g(t) k_{sctrm16cnv} k_{sctrm16} n(t) \\ &\approx k_o I_o g(t) k_{sctrm16cnv} k_{sctrm16} n(t), \end{aligned}$$

where this last approximation holds because of the relatively small amplitude of the product $n(t-\tau)n(t)$ due to the relatively small amplitude of the noise signal.

If this signal is combined with the same optical subsystem output signal after conversion to an electrical signal, that is, signal $v_{22}$ taken from filter 22, the result is $$\begin{aligned} v_{22} k_{sctrm16cnv} I_i(t)|_{variable} + v_{22} &= k_o I_o g(t) k_{sctrm16cnv} k_{sctrm16} n(t) + \\ &\quad k_o I_o g(t) + k_o n(t-\tau) g(t) \\ &= k_o I_o g(t) + \\ &\quad k_o [n(t-\tau) + \\ &\quad I_o k_{sctrm16cnv} k_{sctrm16} n(t)] g(t). \end{aligned}$$

The constant $k_{sctrm16cnv}$, in representing the conversion process for converting the optical intensity noise signal at non-reflective termination arrangement 16' to an electrical signal, is adjustable by the operator of the system. Thus, the multipled factors $I_o k_{sctrm16cnv} k_{sctrm16}$ can be set to meet the condition $$I_o k_{sctrm16cnv} k_{sctrm16} \stackrel{\Delta}{=} 1,$$

by suitably adjusting the constant $k_{sctrm16cnv}$ with the result $$v_{22} k_{sctrm16cnv} I_i(t)|_{variable} + v_{22} = k_o I_o g(t) + k_o [n(t-\tau) + n(t)] g(t).$$

However, since $n(t-\tau)+n(t)$ is effectively a notch filter for frequency components near $\omega_m \tau = \pi, 3\pi, 5\pi, \ldots$, the noise frequency components near the proper frequency are cancelled leaving the desired signal $k_o I_o g(t)$ for demodulation to provide an output signal free of optical intensity noise. That is, the addition of two noise frequencies of which one is delayed with respect to the other by a time $\tau$, either $k_1 \sin \omega_m t + k_1 \sin \omega_m (t-\tau)$ or $k_2 \cos \omega_m t + k_2 \cos \omega_m (t-\tau)$, yields a zero result as can be shown with the use of corresponding trigonometric identities for $\omega_m \tau = \pi$. Noise frequencies sufficiently close to $\omega_m$ will also be correspondingly small to effectively provide this notch filtering action.

Figure 8:
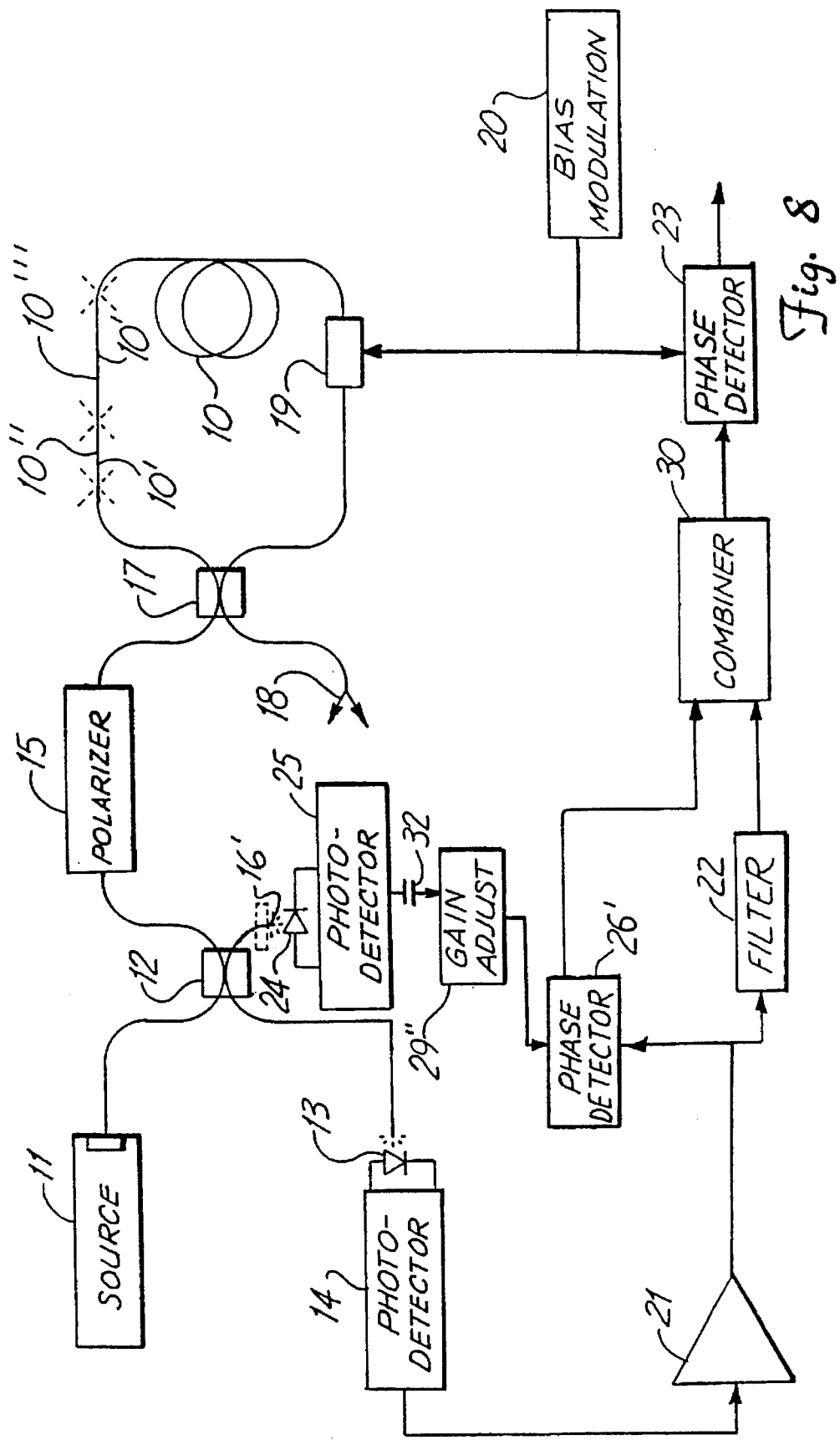
FIG. 8 shows another alternative system schematic diagram combining a signal processing arrangement and an optical transmission path and device arrangement embodying the present invention.

FIG. 8 shows a system, using the same numerical designations used in the previous system figures described above for similar items, in which the output signal from the optical subsystem of FIG. 1, converted to an electrical signal by photodiode 13 in photodetection system 14, is used, after amplification in amplifier 21, as a demodulation reference signal provided to a phase detector, 26'. Phase detector 26' also receives the signal to be demodulated from a gain adjuster, 29". This signal received from gain adjuster 29" is the noise signal obtained from termination arrangement 16', after conversion to an electrical signal in photodiode 24 and associated electronics 25, but retaining therein only the variable portion of the signal from electronics 25 because of the use of a blocking capacitor, 32, to transmit this converted noise signal to gain adjuster 29". Phase detector 26' is a phase sensitive detector like phase detector 23 earlier described, and gain adjuster 29" is a gain adjuster like gain adjuster 29 earlier described. The modulated signal obtained from phase detector 26' is provided to combiner 30 along with the electrical signal from filter 22 based on the input signal thereto from amplifier 21. Combiner 30, as before, algebraically combines these two signals and provides them to phase detector 23 for demodulation using the signal provided by bias modulator 20 as the demodulating signal. Alternative to what is shown in FIG. 8, rather than using phase detector 23 after combiner 30, two phase detectors can be used on each of the input signals to combiner 30, i.e. demodulation can be accomplished before combining rather than after.

As can be seen by comparing the system of FIG. 8 to the system of FIG. 5, the need for a signal generator to provide a generated construct signal in the system of FIG. 5 is no longer present in the system of FIG. 8. Thus, there can be a cost and complexity saving with the system of FIG. 8.

An alternative way of arriving at the system of FIG. 8 can be given by starting with the system of FIG. 5 and considering the nature of the "generated construct" signal set out above when operating at the proper frequency having $\omega_m \tau = \pi$. By inserting this proper frequency condition into the expression for the "generated construct" signal given above, and with the use of appropriate trigonometric identities, this "generated construct" expression can be shown, ignoring rotation, to match within a constant a Bessel series expansion of g(t), the parameter defined above in providing the basis for the system of FIG. 8. The Bessel series expansion of g(t) ignoring rotation has not been set out explicitly above, but can be seen from the definition thereof and the expansion used in finding the first and second portions of the noise error signal expression also set out above in providing the basis for the system of FIGS. 2A and 2B. From the definition of g(t) as part of the optical subsystem output signal falling on photodetector 13, as set out above, that optical subsystem output, converted to an electrical signal, is shown to be able to provide the needed demodulation signal so that construct generator 31 in the system of FIG. 5 can be replaced by the optical subsystem output signal in that system to provide the system of FIG. 8. The need for blocking capacitor 32 in the system of FIG. 8 arises in the occurrence of additional terms that are introduced when rotation occurs, i.e. for $\phi_r \neq 0$.

In addition to a representation of the source noise being conveniently accessible at non-reflective termination arrangement 16 in the system of FIG. 1, another representation of that noise is also conveniently accessible at non-reflective termination arrangement 18 in that system. There, however, the noise signals can be mixed with significantly greater optical rotation information signals since the electromagnetic waves reaching non-reflective termination arrangement 18 have passed through coil 10 and recombined in loop coupler 17 to be directly coupled to that termination arrangement. Obtaining signals at termination arrangement 18 without such rotation information signal components therein is quite difficult because of couplings between polarization modes and the like. However, the use of a very high quality polarization-maintaining fiber optical directional coupler for loop coupler 17 provides the possibility of obtaining access to optical signals reflecting only the noise of source 11 without having rotation information signal components mixed therewith. Thus, assuming a directional optical coupler formed from polarization-maintaining optical fiber with a 0.5 coupling ratio serving as loop coupler 17, and one having both negligible loss therein and negligible coupling between polarization modes therein, the portion of the optical subsystem of FIG. 1 past polarizer 15 but before loop coupler 17 can be represented by a transfer matrix, $G_{cw}$, as $$G_{cw} = \begin{bmatrix} g_{11} & g_{12} \\ g_{21} & g_{22} \end{bmatrix}$$

for the clockwise propagation direction through coil 10. As is well known, this portion of the optical subsystem can be represented for the counterclockwise propagation direction by a related transfer matrix, $G_{ccw}$, as $$G_{ccw} = G_{cw}^T.$$

These transfer matrices are based on a reference point between polarizer 15 and loop coupler 17, and represent the optical subsystem to the right of that reference point including representing the effects of the optical fiber therein, loop coupler 17, and depolarizer 10' between coupler 17 and coil 10 if present.

If, alternatively, that same portion of the optical subsystem is to be represented from a reference point taken at termination arrangement 18, so as to be symmetrically located with respect to loop coupler 17 when compared with the first reference point, the transfer matrices for the clockwise and counterclockwise directions, $G_{cw-term18}$ and $G_{ccw-term18}$, will be related to those at the first reference point but reflect the 90° phase shift associated with electromagnetic waves crossing from one side of coupler 17 to the other. Thus, these termination arrangement transfer matrices are $$G_{cw-term18} = jG_{cw}$$

$$G_{ccw-term18} = jG_{ccw},$$

where $j = \sqrt{-1}$. These termination arrangement 18 transfer matrices, of course, again represent the optical fiber, coupler 17 and any depolarizer present in the portion of the optical subsystem described above.

With these transfer matrices based on a reference point located at termination arrangement 18, the electric field of the electromagnetic waves which propagate to that location from source 11, $E_{term18}$, can be represented as a Jones matrix operator on the basis of the well-known Jones calculus operating on the input electromagnetic wave, $E_i$, provided from source 11 as $$\vec{E} = [G_{cw-term18} + G_{ccw-term18}e^{j\phi}]\vec{E}_i$$

$$= j \begin{bmatrix} g_{11}(1-e^{j\phi}) & g_{12} - g_{21}e^{j\phi} \\ g_{21} - g_{12}e^{j\phi} & g_{22}(1-e^{j\phi}) \end{bmatrix} \begin{bmatrix} E_{pol-x}(t-\tau) \\ E_{pol-y}(t-\tau) \end{bmatrix}$$

where $\phi$ is defined as $$\phi \stackrel{\Delta}{=} \phi_R + \phi_m \cos\left(\omega_m t - \frac{\omega_m \tau}{2}\right),$$

and the input electromagnetic waves to this optical subsection portion are defined as those coming from polarizer 15 in the "x" and "y" axes thereof, i.e. the pass and blocking axes thereof, as delayed by the propagation transit time $\tau$ through coil 10. The electric fields of these components, $E_{pol-x}$ and $E_{pol-y}$, form the components of the electric field of the input wave, or $$\vec{E}_i = \begin{bmatrix} E_{pol-x}(t-\tau) \\ E_{pol-y}(t-\tau) \end{bmatrix}.$$

Assuming that polarizer 15 passes only negligible optical energy along its "y" blocking axis, and that it is connected to source 11 and coupler 17 with polarization-maintaining optical fiber allowing only negligible transmission between the polarization modes therein, $E_{pol-y}=0$. As a result, the electric field at termination 18 becomes $$\vec{E} = j \begin{bmatrix} g_{11}(1-e^{j\phi})E_{pol-x}(t-\tau) \\ (g_{21} - g_{12}e^{j\phi})E_{pol-x}(t-\tau) \end{bmatrix}.$$

If the electromagnetic waves exiting termination 18 are passed through a polarizer to select the "y" polarization of those waves, the polarizer output, $E_{term18-y}$, will be $$E_{term18-y} = j(g_{21} - g_{12}e^{j\phi})E_{pol-x}(t-\tau)$$

giving an intensity $$I_{term18-y} = |E_{term18-y}|^2 = (|g_{21}|^2 + |g_{12}|^2)I_x -$$

$$<g_{21}g_{12}^* e^{-j\phi} + g_{21}^* g_{12} e^{j\phi}> I_x,$$

where $$I_x = |E_{pol-x}(t-\tau)|^2.$$

This result clearly leaves rotation information appearing in the optical signal provided by the electromagnetic waves at termination 18 having the "y" polarization as can be seen in the term following the minus sign on the right in the equation reached just above for the intensity $I_{term18-y}$ of those waves. One way this term could be removed from the expression is to have a depolarizer located between coupler 17 and coil 10 as is shown in the system of FIG. 1. Such a depolarizer, as is well known, imposes the result $$(g_{21}g_{12}^*) = (g_{21}^* g_{12}) = 0,$$

and so provides the result for the "y" axis intensity at termination 18 of $$I_{term18-y} = (|g_{21}|^2 + |g_{12}|^2)I.$$

The presence of a depolarizer between coupler 17 and coil 10 also, as is well known, serves to establish a value for the square of the absolute value of each of the remaining transform matrix components in this last expression, this value being $$|g_{21}|^2 = |g_{12}|^2 = \tfrac{1}{8}\zeta,$$

where $\zeta$ is the loss in coil 10 which depends on the length of that coil. As a result, the intensity of the electromagnetic waves in the "y" axis at termination 18 after passing through the polarizer provided thereat becomes $$I_{term18-x} = \frac{\zeta}{4} I_x.$$

Thus, these electromagnetic waves in the "y" axis at termination 18 directly represent the source intensity, including its noise components, and include the effects of delay and propagation through coil 10. The result is independent of the modulation applied, and of the rotation encountered while propagating through that loop. Hence, the use of high quality components between source 11 and coil 10 that give sufficiently good separation between the polarization modes therealong can provide information as to the source intensity, including its noise, which is unmixed with rotation information signal components.

Figure 9:
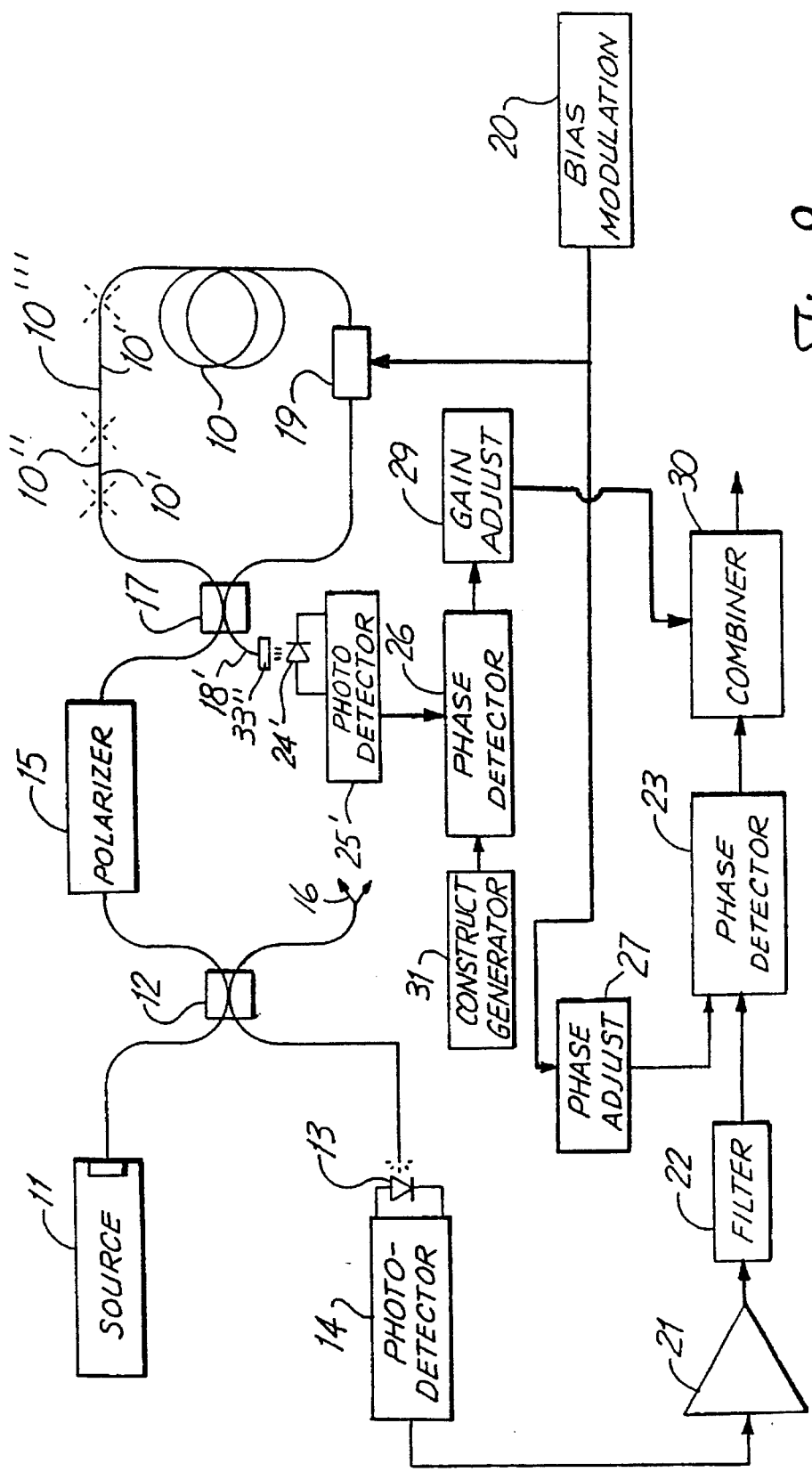
FIG. 9 shows a further alternative system schematic diagram combining a signal processing arrangement and an optical transmission path and device arrangement embodying the present invention.

As a result, the signal derived from the optical signal at termination arrangement 18 passing through a polarizer selecting its "y" axis component to be converted to an electronic signal in a photodiode, can be used in any of the systems shown in FIGS. 2A, 2B, 5 or 8 for reducing noise if the optical subsystems of those systems meet the requirements set out above. FIG. 9 shows such a system result based on the system shown in FIG. 5, and uses the same numerical designations for corresponding items in each. Non-reflecting termination arrangement 18 of FIG. 1 is not used in FIG. 9, and so the output of loop couplers 17 on the polarizer 15 side thereof, which ended in termination arrangement 18 of FIG. 1, has been redesignated 18' as an optical signal carrier to bring the optical intensity signal thereat to a polarizer, 33, used to select the electromagnetic waves traveling along the "y" axis of that fiber. No length of dispersive optical fiber is needed here, however, even if the optical fiber in coil 10 is dispersive at the source primary frequency since the nature of the noise in the waves reaching termination arrangement 18' will be essentially the same as that of the waves reaching photodiode 13 as they all at these two locations will have completed propagating through this dispersive medium.

The selected electromagnetic waves then impinge on a photodiode, 24', similar to photodiode 13, which is operated by a photodetector operating circuit arrangement, 25', which again may be the type used in photodetection system 14. The converted electrical signal from the output of photodetector operating circuit 25' is then supplied to phase detector 26, the output signal of which is again provided through gain adjuster 29 to combiner 30 to be combined with the system initial output signal from phase detector 23.

Depolarizer 10' is constructed as two lengths of polarization-maintaining optical fiber joined together with their polarization axes in each at equal angles with respect to those of the other, or 45°, and with the opposite ends each connected to ordinary single mode optical fiber forming coil 10 and spliced to the polarization-maintaining optical fiber extending from coupler 17. Alternatively, the polarization-maintaining optical fiber extending from coupler 17 may be joined with a single length of polarization-maintaining optical fiber with the polarization axes at equal angles to one another, again 45°. Noise occurring in the input intensity $I_i$ from source 11, which in part becomes $I_x$, will again clearly affect the intensity of the electromagnetic waves impinging on photodiode 24' even with depolarizer 10' present as $I_x$ is a multiplicative factor in each of the last two equations.

However, the arrangement of the system of FIG. 9 may not be as effective as it is in the system of FIG. 5 because the electromagnetic waves at termination 18', after passing through a polarizer, have followed a different optical path from that followed by those waves reaching photodetector 13 and thus depend differently on the path's parameters. As indicated above, the intensity of the electromagnetic waves at the output of polarizer 33 can be represented as $(|g_{21}|^2 + |g_{12}|^2)I_x$. But, as is well known, photodetector 13 will receive electromagnetic waves having an intensity which can be represented as $|g_{11}|^2(2 + 2\cos\phi)I_x$. Different parts of the spectrum of the electromagnetic waves emitted from source 11 to propagate through the system will be present in $|g_{11}|^2$ than in $|g_{12}|^2$. Different spectrums received at photodetectors 13 and 24' can mean different noise components being received at each also which may prevent full noise cancellation at least in some situations.

If the noise comes from current fluctuations through source 11, or from flicker noise, electronic signals based on the optical signals at either photodiodes 24 or 24' in the systems of FIGS. 5 and 9 should be directly subtractable from the initial system signals from photodiode 13 since all the noise at every frequency goes up and down with these fluctuations in the source intensity. If mode partition noise is dominating so that the instantaneous optical power is jumping between various ones of many different relatively narrow frequency bands, the noise at photodetectors 13 and 24' will be anti-correlated, not appearing at one when appearing at the other, and so signals representing noise at each can be added to reduce this noise. Broadband thermal noise is likely to be uncorrelated at photodetectors 13 and 24' because of the differences in paths, and so the signal representing the noise from termination 18' may not be able to be used with the initial system signal from photodetector 13 because of a lack of correlation. Adding signals obtained from the signal path including photodetector 24 in the system of FIG. 5 and those obtained from the signal path including photodetector 24 in the system of FIG. 9, in a system representing a combination of the systems shown in those figures, to the initial system output signal obtained from photodetector 13 may reduce this thermal noise in the system final output signal.

Figure 10A:
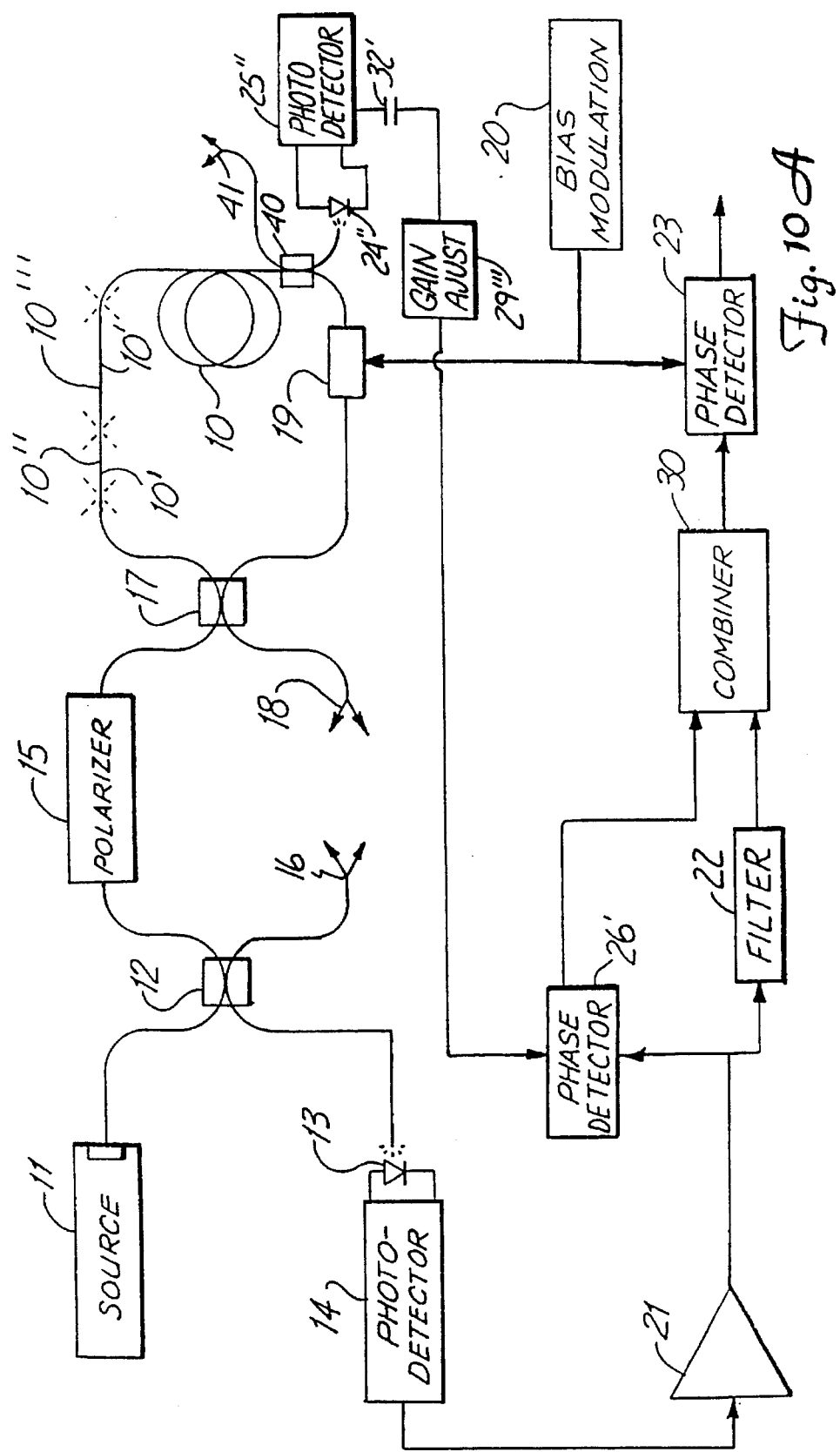
FIG. 10A shows yet another alternative system schematic diagram combining a signal processing arrangement and an optical transmission path and device arrangement embodying the present invention with FIG. 10B showing an alternative to a portion thereof.

A gyroscope system less difficult to implement which also has the advantage of having the same dispersion encountered by both the electromagnetic waves providing the optical subsystem output signal and the waves used to provide a noise signal representation for purposes of cancelling noise components in the system initial output signals is shown in FIG. 10A. Those waves providing such a noise signal representation are obtained in the system of FIG. 10A by an optical directional coupler, 40, formed by fusing a fiber with the optical fiber extending between coil 10 and phase modulator 19, and will typically couple a fraction of the clockwise electromagnetic wave that has propagated through coil 10 thereto to a photodetector, 24", against which it is positioned, and which may be a photodiode like photodiode 13.

Coupler 40 could instead be formed between loop coupler 17 and phase modulator 19, or between coupler 17 and coil 10 on the opposite side thereof, but the location shown eliminates the effects of intensity and polarization modulation, due to phase modulator 19, occurring in the coupled signal. The fraction coupled need not be too great, and can be well below half. No polarizer is needed here to select any polarization component since the electromagnetic waves coupled by coupler 40 are part of just those passed by polarizer 15 and there is no rotation information in them since they have not interfered at this point with the counterclockwise waves. The fraction of the counterclockwise electromagnetic waves also coupled by coupler 40 propagate to a non-reflective termination arrangement, 41.

Figure 10B:
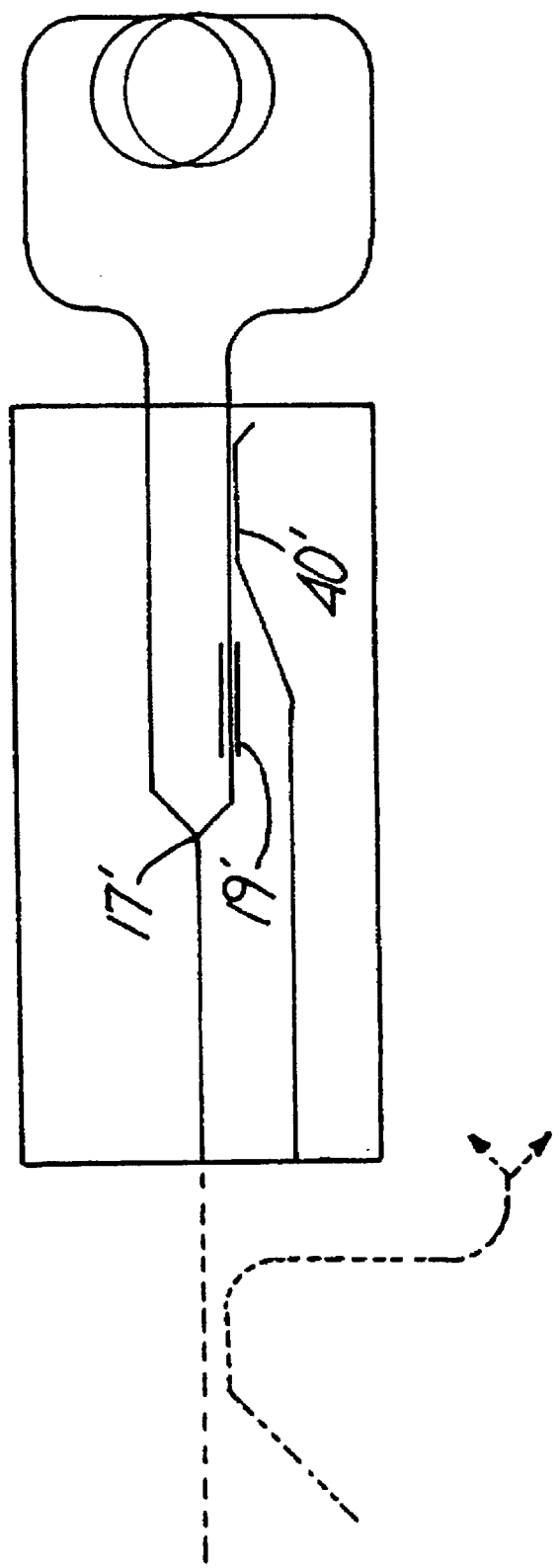

If phase modulator 19 and loop coupler 17 are formed in an integrated optics chip, coupler 40 could alternatively be formed in that same chip along one of the waveguides therein supporting propagation of electromagnetic waves through that chip to split to propagate in opposite directions through that modulator and coil 10 as shown in FIG. 10B. There, an example of an integrated optics chip, 42, is shown having a "Y" junction waveguide provided therein to form a loop coupler, 17', having a lower branch with a phase modulator, 19', formed on either side thereof. Between phase modulator 19' and the right-hand edge of chip 42 is formed a directional coupler, 40', having a waveguide extending therefrom leftward by phase modulator 19' to the left-hand edge of that chip (to minimize bending of that waveguide to keep losses relatively low) to be coupled to photodiode 24" not shown in FIG. 10B. Chip 42 is shown in FIG. 10B with dashed line indications of the two optical fiber ends of coil 10 being abutted thereto at the two waveguide branches ends on the right-hand edge of that chip, and an optical fiber end of source coupler 12 abutted to the end of the single waveguide at the left-hand edge of that chip.

Returning to FIG. 10A, photodiode 24", along with its operating electronics, provided in a photodetection system, 25", are used to convert the coupled fraction of the clockwise electromagnetic waves to a corresponding electrical output signal. The output signal of photodetection system 25" passes through a capacitor, 32', to allow only the variable portion thereof to reach a gain adjuster, 29''', which adjusts the amplitude of that signal and transmits it to phase detector 26' which operates as it did in FIG. 8. Combiner 30 receives signals from phase detector 26' and the system initial output signal from filter 22 to combine them by subtraction in subtracting the former from the latter. Phase detector 23 recovers the baseband signal. Since the electromagnetic waves reaching coupler 40, to be coupled or passed thereby, have been through any dispersive medium in in coil 10, any alteration of the nature of the noise components therein by dispersion in this medium will be completed so waves of the same noise nature reach both photodiodes 13 and 24" to be converted into corresponding electrical signals which will be shown to permit significant noise reduction in the system final output signals.

Thus, the output signal $v_{22}$ of filter 22 is again $k_o I_D(t)$ or $$v_{22}=k_o g(t)[I_o+n(t-\tau)].$$

The noise signal, $v_{25''}$, at the output of photodetection system 25" will again be the source input noise, shifted in time by the transit time through coil 10, and multiplied by constants representing optical subsystem loss, $k_{cplr40}$, and the conversion of the optical subsystem signal at the coupler, $k_{cplr40cnv}$, to a corresponding electrical signal, or $$v_{25''}=k_{cplr40}k_{cplr40cnv}[I_o+n(t-\tau)].$$

Essentially the same delay occurs for the noise signal as occurs for that system initial output signal taken at the output of filter 22, and so there is no need for the same kind of phasing considerations in demodulation of these signals to overcome any delay differences therebetween. In addition, the effects of phase modulator 19 are not present on this noise signal since the electromagnetic waves coupled by coupler 40 to photodiode 24" have not passed therethrough. The presence of blocking capacitor 32' and gain adjuster 29''' providing gain G reduces this noise signal to an output signal, $v_{29'''}$, for that gain adjuster of $$v_{29'''}=Gk_{cplr40}k_{cplr40cnv}n(t-\tau).$$

This last signal and signal $v_{22}$ are effectively multiplied together 19' in phase detector 26' with the result providing a detector output signal, $v_{26}$, of $$v_{26}=v_{22}v_{29'''}=Gk_o k_{cplr40}k_{cplr40cnv}g(t)I_o n(t-\tau),$$

where a term involving the square of the noise signal has been dropped as being insignificant since the noise signal amplitude is so small. Subtracting this last signal from the system initial output signal in combiner 30 provides a combiner output signal $v_{30}$, of $$v_{30}=v_{22}-v_{26}=k_o g(t)I_o+k_o g(t)n(t-\tau)-Gk_o k_{cplr40}k_{cplr40cnv}g(t)I_o n(t-\tau).$$

Now, if the gain G of gain adjuster 29''' is adjusted so that $$G=\frac{1}{k_{cplr40}k_{cplr40cnv}I_o},$$

then $$v_{30}=k_o g(t)I_o,$$

the desired value therefor.

Thus, the desired system final output signal is obtained in the arrangement of FIG. 10A. Further, this result is achieved without any dependence on the modulation scheme used nor on the frequency of any periodic waveform used in such modulation. A further directional optical coupler is needed, although it does replace a polarizer in the arrangement of FIG. 9, which by coupling out some light may lead to a wave intensity imbalance in coil 10 which could increase the well known Kerr effect phase error though not a necessarily significant increase. The electromagnetic wave intensity at photodiode 24" must be great enough so that the noise therein is dominated by the optical intensity noise component which will require source 11 to be a relatively high optical power source.

Although the systems in FIGS. 1, 2A, 2B, 5, 8, 9, and 10A are shown as though they were formed as all optical fiber gyroscopes, they can alternatively be constructed using partly optical fiber and partly integrated optics chips as suggested in FIG. 10B. In such a gyroscope, an integrated optics chip typically contains phase modulator 19, loop coupler 17 and polarizer 15. In that arrangement, the phase modulation frequency is typically at the proper frequency for coil 10 because phase modulator 19, implemented in an integrated optics chip, can be more easily operated at high frequencies than can an implementation thereof in an all optical fiber construction. In addition, and for the same reason, the modulation waveform is typically a square wave rather than a sinusoidal wave since it is easier to generate and the high frequencies represented by the corners therein are not degraded as they often are in an all optical fiber implementation. Such an arrangement is especially useful in a closed loop fiber optic gyroscope as opposed to an open loop fiber optic gyroscope, this latter system merely using the final system output signal to give a direct indication of the rotation rates sensed about its sensing axis perpendicular to the plane at which coil 10 is substantially wound.

Figure 11:
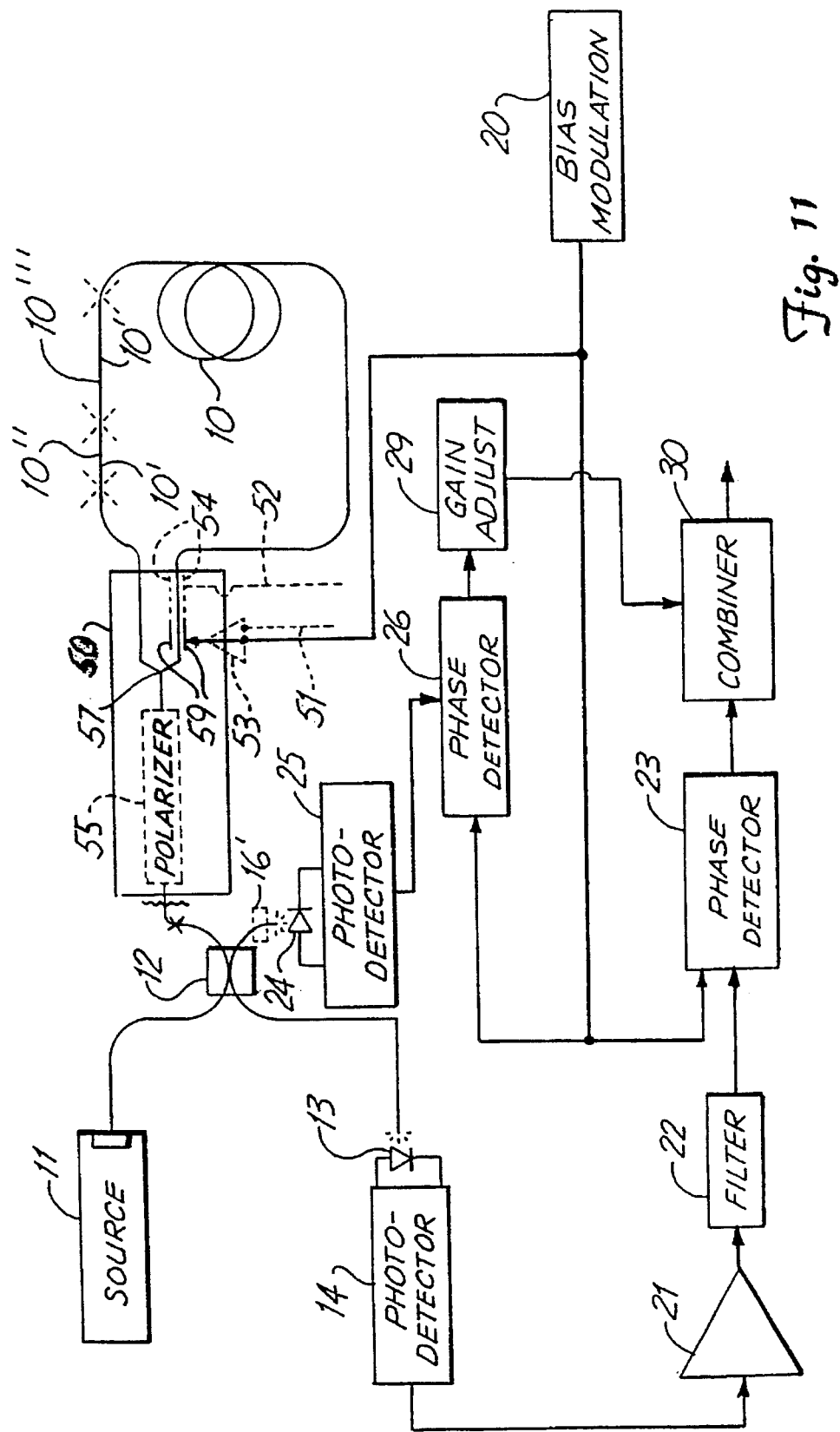
FIG. 11 shows still another alternative system schematic diagram combining a signal processing arrangement and an optical transmission path and device arrangement embodying the present invention.

In a closed loop system, the final system output signal after corrections from noise thereto is, after some manipulation, used to null the phase change caused between the clockwise and counterclockwise waves propagating through coil 10 as a result of any rotation of coil 10 about its sensing axis. Typically, the system final signal after any noise corrections thereto is a feedback signal which, after various possible manipulations, is introduced into the electromagnetic waves propagating past loop coupler 17 and either through having it added to the signal provided by bias modulation generator 20, or separately by use of a further phase modulator provided just before introducing the feedback signal. If the optical subsystem shown in FIG. 11 is used with a part thereof being partially implemented in an integrated optics chip, 50, the system final output signal after any correction for noise would be introduced as a feedback signal into that optical subsystem at a dashed line, 51, for combining with the signal from modulation generator 20, and in the alternative, the feedback signal would be introduced at an alternative dashed line, 52, for operating a further phase modulator formed in chip 50. Once again, designations used for items in FIG. 11 are the same as those used for corresponding items in the previous figures showing system implementations.

The feedback signal in the first instance, provided at line 51, is to be combined with the signal from bias modulation generator 20, and a signal combining means, 53, is used having each of these signals as inputs thereto. Alternatively, if the second instance is chosen of a separate phase modulator being provided for introducing the feedback signal, the feedback signal on input dashed line 52 will be routed to such an additional phase modulator, 54, which is shown formed about a waveguide in integrated optics chip 50 to thereby influence electromagnetic waves propagating through that waveguide by virtue of the electrooptic effect.

The other portions of integrated optics chip 50 represent counterparts to the optical components introduced in the systems of FIGS. 1, 2A, 2B, 5, 8 and 9, these components including a polarizer, 55, and a "Y" junction of waveguides to form a loop coupler, 57, and further including a phase modulator, 59, also operating about the same waveguide as would phase modulator 54, if used, and similarly making use of the electrooptic effect. Some kinds of integrated optics chips do not need any special or added structure for a polarizer since the waveguides therein substantially attenuate one of the orthogonal polarization components attempting to propagate therethrough. In that situation, polarizer 45 should be considered to be omitted in integrated optics chip 50 and thus is shown only as a dashed line block in FIG. 11. Typically, there will be no non-reflective termination available in connection with coupler 57.

The output of signal combining means 53, if used, becomes the input for phase modulator 59. Otherwise, phase modulator 59 is energized directly by bias modulation generator 20 shown by the solid line continuing from bias modulation generator 20 straight through signal combining means 53 to phase modulator 59. If signal combining means 53 is to be used, the solid line therethrough should be considered omitted in FIG. 11.

The signal to be fed back in a closed loop system is usually desired to be a serrodyne, or "sawtooth," waveform signal as this waveform allows nulling out a constant phase different due to a constant input rate of rotation of coil 10 about its sensing axis. Such a waveform will have substantially high frequency content, and an integrated optics chip is needed in these circumstances because, as indicated above, the wide bandwidth of a phase modulator formed in a chip offers compared to the bandwidth of a phase modulator in which a length of optical fiber is stretched and relaxed by a controlled piezoelectric ring or disk to provide the desired phase modulation therein.

The end of coil 10 can be spliced to an optical fiber extension extending from the upper waveguide of integrated optics chip 50 in FIG. 11. Alternatively, that same end of optical fiber coil 10 can be abutted, or spliced, directly to the edge of integrated optics chip 40 at the waveguide forming the upper branch of the "Y" coupler 47 in FIG. 11. The opposite end of optical fiber coil 10 is then abutted, or spliced, directly to the edge of integrated optics chip 50 at the waveguide forming the lower branch of the "Y" coupler 57 in FIG. 11. Alternatively, that end of coil 10 can instead be spliced to an extension length of optical fiber extending from the lower waveguide of integrated optics chip 50.

A polarization-maintaining optical fiber extending from source directional coupler 12 is shown in FIG. 11 coming to a splice with a polarization-maintaining optical fiber extending from the waveguide of chip 50 leading to polarizer 55 therein. With this splice, the "x" axis of each fiber is aligned with one another as are the "y" axes of each. Alternatively, the polarization-maintaining optical fiber extending from source coupler 12 could be directly connected to the waveguide of integrated optics chip 50 leading to polarizer 55 therein. In that situation, the "x" axis of this fiber is aligned with the waveguide such that electromagnetic waves passing therethrough from source coupler 12 will reach the transmission axis of polarizer 55 with relatively little loss (or aligned with the transmission axis of that waveguide if it passes one polarization mode in that axis and blocks the other orthogonal mode inherently without a need for polarizer 55).

The intensity of the electromagnetic waves impinging on photodiode 13 can be expressed much as above if the optical subsystem of FIG. 11 is in an open loop system, the expression being $$I_D(t) = \frac{L}{2} I_i(t-\tau)\{1 + \cos[\phi_m S_{qr}(t,T_o)]\},$$

where $S_{qr}(t,T_o)$ denotes a square wave over time having a period of $T_o$ that is switching back and forth between amplitudes of −1 and +1, i.e. the waveform of the output signal of bias modulation generator 20 to within a constant. Since the cosine of a negative angle is equal to the cosine of the angle, this last equation can be simply written as $$I_D(t) = \frac{L}{2} I_i(t-\tau)\{1 + \cos\phi_m\}.$$

In each of these equations, the phase angle change due to rotation has been ignored assuming that again the angle is quite small so as to leave noise a significant problem.

If the optical subsystem of FIG. 11 is instead in a closed loop gyroscopic system, the intensity of the electromagnetic waves impinging on photodiode 13 can again be represented by an expression similar to those used above but with an added term depending on angular acceleration of coil 10 about its sensing axis. The expression is $$I_D(t) = \frac{L}{2} I_i(t-\tau)\{\{1 + \cos\{\phi_m S_{qr}(t,T_o) + k_{mod}\alpha\}\}\},$$

where $\alpha$ is the angular acceleration of coil 10 about the sensing axis and $k_{mod}$ is a constant relating acceleration to a phase change, and includes the amplitude of the output of generator 20. This added term dependent on angular acceleration arises because of the provision of a closed loop, the loop trying to control of the phase difference between the counterpropagating waves in coil 10 but always based on a previous modulation cycle that no longer represents the current phase situation, thus leaving an error to exist during rotation rate changes. As a result, a square wave component will arise in the output intensity during angular acceleration which will disappear after such acceleration stops allowing the loop to eliminate the error. As the feedback loop seeks eliminate the square wave component in the output intensity of the optical subsystem through nulling out the phase changes introduced between the counter propagating electromagnetic waves, any odd harmonic noise, particularly first harmonic, will interfere with the loop nulling and thereby give corresponding fluctuations in the loop signal which is also the output signal for the system. As will be seen, if the system is operated at the proper frequency which is normally done in a system containing an integrated optics chip, all of the odd harmonics of the source intensity noise are out of phase with each other as they appear at non-reflective termination arrangement 16 and at photodiode 13. This permits the addition of electrical signals converted from the optical signals at those locations to be added together with appropriate gains to thereby cancel the source optical intensity noise.

From the foregoing expressions for both the open loop and closed loop systems employing an integrated optics chip, the intensity of the electromagnetic waves impinging on photodiode 13 can be written as $$I_D(t)=CI_i(t-\tau)$$

where C represents L/2 times the factor in braces in the first two of the last three preceding expressions, and the factor in the double braces in the immediately preceding expression, which will be substantially constant except for periods of significant angular acceleration of coil 10 about its sensing axis. The intensity of the optical noise signal which will be available at termination arrangement 16' can, from above, be written as $$I_{16'}(t)=k_{sctrm16'}I_s(t).$$

Expressing optical intensity noise in a narrow bandwidth again as $$I_i(t)=I_o+\delta I(\omega)\cos[\omega t+\phi(\omega)],$$

the intensity falling on photodetector 13 becomes $$I_D(t)=CI_o+C\delta I(\omega)\cos[\omega t-\omega\tau+\phi(\omega)].$$

If $\omega_{m-p}$ is the modulation frequency selected as the proper frequency for coil 10 so that $\omega_{m-p}\tau=\pi$, then the odd harmonics will be $\omega=(2n+1)\omega_{m-p}$. Thus, the odd harmonics of the optical signal impinging on photodiode 13, $I_{D-oh}(t)$, can be written $$I_{D-oh(t)} = CI_o + \sum_{n=1}^{\infty} C\delta I((2n+1)\omega_{m-p})\cos[(2n+1)\omega_{m-p}t - (2n+1)\omega_{m-p}\tau + \phi((2n+1)\omega_{m-p})]$$

$$= CI_o - \sum_{n=1}^{\infty} C\delta I((2n+1)\omega_{m-p})\cos[(2n+1)\omega_{m-p}t + \delta((2n+1)\omega_{m-p})].$$

Similarly, the odd harmonics of the intensity of the optical noise signals available at termination 16', $I_{16'-oh}$ will be $$I_{16'-oh} = k_{sctrm16'}I_o + \sum_{n=1}^{\infty} k_{sctrm16'}\delta I((2n+1)\omega_{m-p})\cos[((2n+1)\omega_{m-p})t + \phi((2n+1)\omega_{m-p})].$$

As was shown above, only the odd harmonics of the noise can provide frequency differences equal to the demodulation frequency in the mixing occurring during the demodulation. Since the odd harmonics in each of the last two expressions are the same within a constant of opposite sign, conversion of these intensities to electronics signals in the system of FIG. 11 by photodiodes 13 and 24, respectively, followed by demodulation in phase detectors 23 and 26, respectively, each using the same demodulating signal from bias modulation generator 20, will leave the result of demodulating these noise harmonics to being substantially equal again within a constant. Thus, the use of gain adjuster 29 to adjust the amplitude of the output signal from phase detector 26 to be of the same amplitude as the corresponding noise component is in the output of phase detector 23 permits them to cancel one another upon being additively combined in combiner 30. Thus, the source optical intensity noise at odd harmonics of the proper frequency is cancelled.

Although the present invention has been described with reference to preferred embodiments, workers skilled in the art will recognize that changes may be made in form and detail without departing from the spirit and scope of the invention.

What is claimed is:

1. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said optical processing subsystem further comprises a source coupler having a pair of ports on a source side thereof serving as said optical processing subsystem pair of source side ports, and a pair of ports on a loop side thereof, such that electromagnetic waves, occurring at said loop side port, are substantially transmitted through a coupling region in said source coupler to thereafter occur at least in part at both of said source side ports, and such that electromagnetic waves, occurring at said source side ports, are substantially transmitted through said coupling region to thereafter occur at least in part at both of said loop side ports;

said second coupling means couples electromagnetic waves from a said source coupler loop side port to said second photodetector; and said second coupling means further comprises a selected length of optical fiber that is more dispersive than said coiled optical fiber at a primary wavelength of said source to couple electromagnetic waves from a said selected location in said optical processing subsystem to said second photodetector.

2. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said optical processing subsystem further comprises a source coupler having a pair of ports on a source side thereof serving as said optical processing subsystem pair of source side ports, and a pair of ports on a loop side thereof, such that electromagnetic waves, occurring at said loop side port, are substantially transmitted through a coupling region in said source coupler to thereafter occur at least in part at both of said source side ports, and such that electromagnetic waves, occurring at said source side ports, are substantially transmitted through said coupling region to thereafter occur at least in part at both of said loop side ports;

said second coupling means couples electromagnetic waves from a said source coupler loop side port to said second photodetector; and said noise reduction means has a system first signal component phase detection means having both a detection input electrically connected to said first photodetector to receive said system conversion signals, and a demodulation input electrically connected to an output of a modulation signal generator which is also electrically connected to an input of said phase modulator, said system first signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a noise signal phase detection means having both a detection input electrically connected to said second photodetector to receive said noise conversion signals, and a demodulation input electrically connected to an output of a construct signal generator capable of generating selected periodic output signals at said output thereof, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, said system and said noise signal phase detection means each having said outputs thereof electrically connected to corresponding inputs of a combining means capable of combining selected signals provided at said inputs thereof to provide an output signal at an output thereof based on said combined signals.

3. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said optical processing subsystem further comprises a source coupler having a pair of ports on a source side thereof serving as said optical processing subsystem pair of source side ports, and a pair of ports on a loop side thereof, such that electromagnetic waves, occurring at said loop side port, are substantially transmitted through a coupling region in said source coupler to thereafter occur at least in part at both of said source side ports, and such that electromagnetic waves, occurring at said source side ports, are substantially transmitted through said coupling region to thereafter occur at least in part at both of said loop side ports;

said second coupling means couples electromagnetic waves from a said source coupler loop side port to said second photodetector; and said noise reduction means further comprises a noise signal phase detection means having both a detection input electrically connected to said second photodetector to receive said noise conversion signals, and a demodulation input electrically connected to an output of a construct signal generator capable of generating selected periodic output signals at said output thereof, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a combining means having an input electrically connected to said first photodetector to receive said system conversion signals and having another input electrically connected to said noise signal phase detection means output, and being capable of combining selected signals provided at said inputs thereof to provide an output signal on an output thereof based on such combined signals; and further having a signal component phase detection means having both a detection input electrically connected to said combining means output and having a demodulation input electrically connected to a modulation signal generator which is also connected to said phase modulator, said signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency.

4. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said optical processing subsystem further comprises a source coupler having a pair of ports on a source side thereof serving as said optical processing subsystem pair of source side ports, and a pair of ports on a loop side thereof, such that electromagnetic waves, occurring at said loop side port, are substantially transmitted through a coupling region in said source coupler to thereafter occur at least in ,part at both of said source side ports, and such that electromagnetic waves, occurring at said source side ports, are substantially transmitted through said coupling region to thereafter occur at least in part at both of said loop side ports;

said second coupling means couples electromagnetic waves from a said source coupler loop side port to said second photodetector; and said noise reduction means has a system first signal component phase detection means having both a detection input electrically connected to said first photodetector to receive said system conversion signals, and a demodulation input electrically connected to an output of a modulation signal generator which is also electrically connected to an input of said phase modulator, said system first signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a noise signal phase detection means having both a detection input electrically connected to said second photodetector to receive said noise conversion signals, and a demodulation input electrically connected to said first photodetector to receive said system conversion signals, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, said system and said noise signal phase detection means each having said outputs thereof electrically connected to corresponding inputs of a combining means capable of combining selected signals provided at said inputs thereof to provide an output signal at an output thereof based on said combined signals.

5. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said optical processing subsystem further comprises a source coupler having a pair of ports on a source side thereof serving as said optical processing subsystem pair of source side ports, and a pair of ports on a loop side thereof, such that electromagnetic waves, occurring at said loop side port, are substantially transmitted through a coupling region in said source coupler to thereafter occur at least in part at both of said source side ports, and such that electromagnetic waves, occurring at said source side ports, are substantially transmitted through said coupling region to thereafter occur at least in part at both of said loop side ports;

said second coupling means couples electromagnetic waves from a said source coupler loop side port to said second photodetector; and said noise reduction means further comprises a noise signal phase detection means having both a detection input electrically connected to said second photodetector to receive said noise conversion signals, and a demodulation input electrically connected to said first photodetector to receive said system conversion signals, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a combining means having an input electrically connected to said first photodetector to receive said system conversion signals and having another input electrically connected to said noise signal phase detection means output, and being capable of combining selected signals provided at said inputs thereof to provide an output signal on an output thereof based on such combined signals; and further having a signal component phase detection means having both a detection input electrically connected to said combining means output and having a demodulation input electrically connected to a modulation signal generator which is also connected to said phase modulator, said signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency.

6. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system conversion signals having smaller noise-to-signal ratios than do corresponding said system conversion signals used in forming same; and wherein:

said optical processing subsystem further comprises a first coupling means having a pair of ports on said loop side thereof of which one serves as said optical processing subsystem loop side port and that one remaining being coupled to that remaining end of said coiled optical fiber, said first coupling means including said phase modulator;

said first coupling means further comprises:

a polarizer;

a loop coupler having a pair of ports on a loop side thereof, and having a port on a source side thereof coupled to said polarizer, such that electromagnetic waves, occurring at said source side port, are substantially transmitted through a coupling region in said loop coupler to thereafter occur at least in part at both of said loop side ports, and such that electromagnetic waves, occurring at said loop side ports, are substantially transmitted through said coupling region to thereafter occur at least in part at said source side port; and a loop joining means for coupling said pair of loop side ports of said loop coupler to corresponding ends of said coiled optical fiber which includes said phase modulator such that electromagnetic waves, occurring at said loop side ports, are substantially transmitted to said coiled optical fiber to result in electromagnetic waves propagating through said coiled optical fiber in opposite directions; and said loop coupler has a further port on said source side thereof and said second coupling means couples electromagnetic waves from said further source side port of said loop coupler to said second photodetector.

7. The apparatus of claim 6 wherein said second coupling means further comprises a polarizer to couple electromagnetic waves from said loop coupler source side port to said second photodetector.

8. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said second coupling means further comprises an optical directional coupler to couple electromagnetic waves from a said selected location in said selected one of said optical processing subsystem and said coiled optical fiber to said second photodetector; and said noise reduction means has a system first signal component phase detection means having both a detection input electrically connected to said first photodetector to receive said system conversion signals, and a demodulation input electrically connected to an output of a modulation signal generator which is also electrically connected to an input of said phase modulator, said system first signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a noise signal phase detection means having both a detection input electrically connected to said second photodetector to receive said noise conversion signals, and a demodulation input electrically connected to an output of a construct signal generator capable of generating selected periodic output signals at said output thereof, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, said system and said noise signal phase detection means each having said outputs thereof electrically connected to corresponding inputs of a combining means capable of combining selected signals provided at said inputs thereof to provide an output signal at an output thereof based on said combined signals.

9. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said second coupling means further comprises an optical directional coupler to couple electromagnetic waves from a said selected location in said selected one of said optical processing subsystem and said coiled optical fiber to said second photodetector; and said noise reduction means further comprises a noise signal phase detection means having both a detection input electrically connected to said second photodetector to receive said noise conversion signals, and a demodulation input electrically connected to an output of a construct signal generator capable of generating selected periodic output signals at said output thereof, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a combining means having an input electrically connected to said first photodetector to receive said system conversion signals and having another input electrically connected to said noise signal phase detection means output, and being capable of combining selected signals provided at said inputs thereof to provide an output signal on an output thereof based on such combined signals; and further having a signal component phase detection means having both a detection input electrically connected to said combining means output and having a demodulation input electrically connected to a modulation signal generator which is also connected to said phase modulator, said signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency.

10. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said second coupling means further comprises an optical directional coupler to couple electromagnetic waves from a said selected location in said selected one of said optical processing subsystem and said coiled optical fiber to said second photodetector; and said noise reduction means has a system first signal component phase detection means having both a detection input electrically connected to said first photodetector to receive said system conversion signals, and a demodulation input electrically connected to an output of a modulation signal generator which is also electrically connected to an input of said phase modulator, said system first signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a noise signal phase detection means having both a detection input electrically connected to said second photodetector to receive said noise conversion signals, and a demodulation input electrically connected to said first photodetector to receive said system conversion signals, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, said system and said noise signal phase detection means each having said outputs thereof electrically connected to corresponding inputs of a combining means capable of combining selected signals provided at said inputs thereof to provide an output signal at an output thereof based on said combined signals.

11. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said second coupling means further comprises an optical directional coupler to couple electromagnetic waves from a said selected location in said selected one of said optical processing subsystem and said coiled optical fiber to said second photodetector; and said noise reduction means further comprises a noise signal phase detection means having both a detection input electrically connected to said second photodetector to receive said noise conversion signals, and a demodulation input electrically connected to said first photodetector to receive said system conversion signals, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a combining means having an input electrically connected to said first photodetector to receive said system conversion signals and having another input electrically connected to said noise signal phase detection means output, and being capable of combining selected signals provided at said inputs thereof to provide an output signal on an output thereof based on such combined signals; and further having a signal component phase detection means having both a detection input electrically connected to said combining means output and having a demodulation input electrically connected to a modulation signal generator which is also connected to said phase modulator, said signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency.

12. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said noise reduction means has a system first signal component phase detection means having both a detection input electrically connected to said first photodetector to receive said system conversion signals, and a demodulation input electrically connected to an output of a modulation signal generator which is also electrically connected to an input of said phase modulator, said system first signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a noise signal phase detection means having both a detection input electrically connected to said second photodetector to receive said noise conversion signals, and a demodulation input electrically connected to an output of a construct signal generator capable of generating selected periodic output signals at said output thereof, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, said system and said noise signal phase detection means each having said outputs thereof electrically connected to corresponding inputs of a combining means capable of combining selected signals provided at said inputs thereof to provide an output signal at an output thereof based on said combined signals.

13. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said noise reduction means further comprises a noise signal phase detection means having both a detection input electrically connected to said second photodetector to receive said noise conversion signals, and a demodulation input electrically connected to an output of a construct signal generator capable of generating selected periodic output signals at said output thereof, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a combining means having an input electrically connected to said first photodetector to receive said system conversion signals and having another input electrically connected to said noise signal phase detection means output, and being capable of combining selected signals provided at said inputs thereof to provide an output signal on an output thereof based on such combined signals; and further having a signal component phase detection means having both a detection input electrically connected to said combining means output and having a demodulation input electrically connected to a modulation signal generator which is also connected to said phase modulator, said signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency.

14. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said noise reduction means has a system first signal component phase detection means having both a detection input electrically connected to said first photodetector to receive said system conversion signals, and a demodulation input electrically connected to an output of a modulation signal generator which is also electrically connected to an input of said phase modulator, said system first signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, and a noise signal phase detection means having both a detection input electrically connected to said second photodetector to receive said noise conversion signals, and a demodulation input electrically connected to said first photodetector to receive said system conversion signals, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency, said system and said noise signal phase detection means each having said outputs thereof electrically connected to corresponding inputs of a combining means capable of combining selected signals provided at said inputs thereof to provide an output signal at an output thereof based on said combined signals.

15. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein:

said noise reduction means further comprises a noise signal phase detection means having both a detection input electrically connected to said second photodetector to receive said noise conversion signals, and a demodulation input electrically connected to said first photodetector to receive said system conversion signals, said noise signal phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency; and a combining means having an input electrically connected to said first photodetector to receive said system conversion signals and having another input electrically connected to said noise signal phase detection means output, and being capable of combining selected signals provided at said inputs thereof to provide an output signal on an output thereof based on such combined signals; and further having a signal component phase detection means having both a detection input electrically connected to said combining means output and having a demodulation input electrically connected to a modulation signal generator which is also connected to said phase modulator, said signal component phase detection means being capable of using signals supplied at said demodulation input thereof, having a substantial demodulation signal component therein at a selected demodulation frequency, to cause signals to appear at an output thereof representing amplitudes of components of signals occurring at said detection input thereof based on said demodulation frequency.

16. A noise reducer for reducing the results of optical noise occurring in a system having electromagnetic waves propagating in opposite directions in a coiled optical fiber to impinge on a first photodetector with a phase relationship, said noise reducer comprising:

a source capable of supplying an emitted electromagnetic wave characterized by having a selected intensity distributed over a first spectrum of frequencies and by having a further noise intensity distributed over a second spectrum of frequencies;

an optical processing subsystem having a pair of ports on a source side thereof, and at least one port on a loop side thereof, such that one of said pair of ports on said source side thereof is coupled to said source and that port remaining on said source side thereof is coupled to said first photodetector, and such that said port on said loop side thereof is coupled to an end of said coiled optical fiber so as to include in that optical path extending therefrom into that said end of said coiled optical fiber a phase modulator for modulating phases of electromagnetic waves passing therethrough and through said coiled optical fiber;

a second photodetector;

a second coupling means coupling electromagnetic waves from a selected location in selected one of said optical processing subsystem and said coiled optical fiber to said second photodetector such that electromagnetic waves emitted by said source propagate to said second photodetector with delays that are less than half that transit delay time required for electromagnetic waves to propagate through said coiled optical fiber; and a noise reduction means coupled to said first and second photodetectors for providing system conversion signals based on electromagnetic waves impinging on said first photodetector and noise conversion signals based on electromagnetic waves impinging on said second photodetector, said noise reduction means being capable of combining representations of said system conversion signals and representations of corresponding said noise conversion signals to provide corresponding system output signals having smaller noise-to-signal ratios than do corresponding said system conversion signals used in forming same; and wherein said second coupling means further comprises a selected length of optical fiber that is more dispersive than said coiled optical fiber at a primary wavelength of said source to couple electromagnetic waves from a said selected location in said optical processing subsystem to said second photodetector.

* * * * *